(12) United States Patent
Cheng et al.

(10) Patent No.: US 12,462,531 B2
(45) Date of Patent: Nov. 4, 2025

(54) ARTIFICIAL INTELLIGENCE-BASED OBJECT DETECTION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yanhua Cheng, Shenzhen (CN); Yugeng Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 541 days.

(21) Appl. No.: 17/716,316

(22) Filed: Apr. 8, 2022

(65) Prior Publication Data

US 2022/0230420 A1 Jul. 21, 2022

Related U.S. Application Data

(63) Continuation of application No. PCT/CN2021/078066, filed on Feb. 26, 2021.

(30) Foreign Application Priority Data

Apr. 10, 2020 (CN) .......................... 202010281303.0

(51) Int. Cl.
*G06V 10/77* (2022.01)
*G06N 3/045* (2023.01)
(Continued)

(52) U.S. Cl.
CPC ......... *G06V 10/7715* (2022.01); *G06N 3/045* (2023.01); *G06T 3/40* (2013.01); *G06V 10/761* (2022.01); *G06V 10/82* (2022.01)

(58) Field of Classification Search
None
See application file for complete search history.

(56) References Cited

U.S. PATENT DOCUMENTS 10,713,534 B2 7/2020 Brauer
2020/0020092 A1 1/2020 Fang et al.
(Continued)

FOREIGN PATENT DOCUMENTS

CN 108921086 A 11/2018
CN 110378247 A 10/2019
(Continued)

OTHER PUBLICATIONS

Ren, Shaoqing, et al. "Faster R-CNN: Towards Real-Time Object Detection with Region Proposal Networks." arXiv preprint arXiv:1506.01497 (2015). (Year: 2015).*

(Continued)

*Primary Examiner* — Vincent Rudolph
*Assistant Examiner* — Meredith Taylor
(74) *Attorney, Agent, or Firm* — Anova Law Group, PLLC

(57) ABSTRACT

This application discloses an artificial intelligence-based object detection method and apparatus. The method includes inputting a target image comprising an object to an object detection model; obtaining feature images of different scales from the target image using the object detection model; determining image location information of the object and a first confidence level that the object belongs to each category; acquiring a target region in which the object is located; inputting the target region to an object retrieval model, comparing the target region with sample images of a plurality of categories to obtain a second confidence level that the object belongs to each category; and determining a target category of the object based on the first confidence (Continued)

level and the second confidence level, a sum of the first confidence level and the second confidence level of the target category being the largest of the plurality of categories.

18 Claims, 10 Drawing Sheets

(51) Int. Cl.
    *G06T 3/40*     (2024.01)
    *G06V 10/74*     (2022.01)
    *G06V 10/82*     (2022.01)

(56) References Cited

U.S. PATENT DOCUMENTS

2020/0226748 A1* 7/2020 Kaufman ............ G06V 10/809
2022/0108546 A1   4/2022 Xu

FOREIGN PATENT DOCUMENTS

| CN | 110378381 A | 10/2019 |
| CN | 110956616 A | 4/2020 |
| CN | 111476306 A | 7/2020 |
| TW | M558943 U | 4/2018 |
| TW | 201920944 A | 6/2019 |
| TW | 202006603 A | 2/2020 |

OTHER PUBLICATIONS

Wang, Tao, et al. "Few-shot adaptive faster r-cnn." Proceedings of the IEEE/CVF conference on computer vision and pattern recognition. 2019. (Year: 2019).*

The World Intellectual Property Organization (WIPO) International Search Report for PCT/CN2021/078066 Jun. 1, 2021 5 Pages (including translation).

Taiwan Intellectual Property Office Examination report for Application No. 110109024 Sep. 28, 2021 5 pages.

Joseph Redmon et al., "You only look once: Unified, real-time object detection," IEEE Conference on Computer Vision and Pattern Recognition (CVPR), 2016, pp. 779-788. 10 pages.

Joseph Redmon et al., "Yolov3: An incremental improvement," arXiv:1804.02767v1, Apr. 8, 2018. 6 pages.

Wei Liu et al., "SSD: Single shot multibox detector," ECCV 2016, pp. 21-37, 2016. 17 pages.

Ross Girshick et al., "Rich feature hierarchies for accurate object detection and semantic segmentation," IEEE Conference on Computer Vision and Pattern Recognition (CVPR), 2014. 8 pages.

Ross Girshick, "Fast R-CNN," IEEE International Conference on Computer Vision (ICCV), 2015, pp. 1440-1448. 9 pages.

Shaoqing Ren et al. "Faster R-CNN: Towards real-time object detection with region proposal networks," NIPS 2015. 9 pages.

Tsung-Yi Lin et al., "Focal loss for dense object detection," IEEE International Conference on Computer Vision (ICCV), 2017, pp. 2980-2988. 9 pages.

Alex Krizhevsky et al., "ImageNet Classification with Deep Convolutional Neural Networks," NIPS 2012. 9 pages.

Karen Simonyan et al., "Very deep convolutional networks for large-scale image recognition," arXiv:1409.1556v1, Sep. 4, 2014. 10 pages.

Kaiming He et al. "Deep residual learning for image recognition," IEEE Conference on Computer Vision and Pattern Recognition (CVPR), 2016, pp. 770-778. 9 pages.

Andrew G Howard et al., "Mobilenets: Efficient convolutional neural networks for mobile vision applications," arXiv:1704.04861v1, Apr. 17, 2017. 9 pages.

* cited by examiner

US 12,462,531 B2

ARTIFICIAL INTELLIGENCE-BASED OBJECT DETECTION METHOD AND APPARATUS, DEVICE, AND STORAGE MEDIUM

RELATED APPLICATIONS

This application is a continuation application of PCT Application No. PCT/CN2021/078066, filed on Feb. 26, 2021, which in turn claims priority to Chinese Patent Application No. 202010281303.0, filed on Apr. 10, 2020 and entitled "ARTIFICIAL INTELLIGENCE-BASED OBJECT DETECTION METHOD AND APPARATUS, DEVICE, AND STORAGE MEDIUM". The two applications are both incorporated herein by reference in their entirety.

FIELD OF THE TECHNOLOGY

This application relates to the field of image processing technologies, and in particular, to an artificial intelligence-based object detection method and apparatus, a device, and a storage medium.

BACKGROUND OF THE DISCLOSURE

Object detection is one of the classical problems in computer vision, and information such as a category of at least one object included in an image can be determined by using an object detection technology. During object detection, an object detection model usually performs feature extraction on an image, and a location and a category of an object included in the image are predicted based on an extracted image feature.

SUMMARY

Embodiments of this application provide an artificial intelligence-based object detection method and apparatus, a device, and a storage medium. The technical solutions are as follows:

One aspect if this application provides an artificial intelligence-based object detection method, applied to a computer device. The method includes inputting a target image comprising an object to an object detection model; obtaining feature images of different scales from the target image using the object detection model; determining, based on the plurality of feature images of different scales, image location information of the object and a first confidence level that the object belongs to each category; acquiring, from the target image based on the image location information of the object, a target region in which the object is located; inputting the target region to an object retrieval model, the object retrieval model comparing the target region with sample images of a plurality of categories to obtain a second confidence level that the object belongs to each category; and determining a target category of the object in the plurality of categories based on the first confidence level and the second confidence level of each category, a sum of the first confidence level and the second confidence level that correspond to the target category being the largest of the plurality of categories.

Another aspect of this application provides an artificial intelligence-based object detection apparatus is provided. The apparatus includes a first confidence level determining module, configured to: input a target image comprising an object to an object detection model, obtain a plurality of feature images of different scales from the target image; and determine, based on the plurality of feature images of different scales, image location information of the object and a first confidence level that the object belongs each category; a target region acquisition module, configured to acquire, from the target image based on the image location information of the object, a target region in which the object is located; a second confidence level acquisition module, configured to input the target region to an object retrieval model, compare the target region with sample images of a plurality of categories to obtain a second confidence level that the object belongs to each category; and a category determining module, configured to determine a target category of the object in the plurality of categories based on the first confidence level and the second confidence level that correspond to each category, a sum of the first confidence level and the second confidence level that correspond to the target category being the largest.

According to an aspect, a computer device is provided, the computer device including one or more processors and one or more memories, the one or more memories storing at least one program code, and the at least one program code being loaded and executed by the one or more processors to implement the artificial intelligence-based object detection method.

According to an aspect, a non-transitory computer-readable storage medium is provided, the computer readable storage medium storing at least one program code, and the at least one program code being loaded and executed by a processor to implement the artificial intelligence-based object detection method.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

Figure 1:
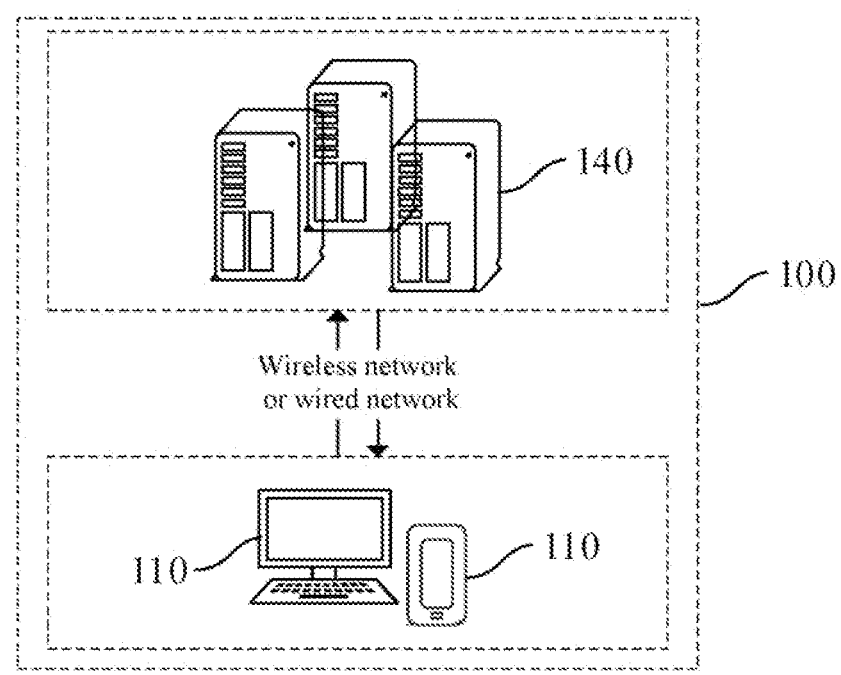
FIG. 1 is a structural block diagram of an object detection system according to an embodiment of this application.

To make objectives, technical solutions, and advantages of this application clearer, the following further describes implementations of this application in detail with reference to the accompanying drawings.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, the artificial intelligence is a comprehensive technology of computer science, which attempts to understand essence of intelligence and produces a new intelligent machine that can respond in a manner similar to human intelligence. The artificial intelligence is to study the design principles and implementation methods of various intelligent machines, to enable the machines to have the functions of perception, reasoning, and decision-making.

The artificial intelligence technology is a comprehensive discipline, and relates to a wide range of fields including a hardware-level technology and a software-level technology. The basic artificial intelligence technology generally includes technologies such as a sensor, a dedicated artificial intelligence chip, cloud computing, distributed storage, a big data processing technology, an operating/interaction system, and electromechanical integration. Artificial intelligence software technologies mainly include several major directions such as a computer vision technology, a speech processing technology, a natural language processing technology, and machine learning/deep learning. Embodiments of the present application relate to a computer vision technology and a machine learning/deep learning technology.

The computer vision (CV) is a science that studies how to use a machine to "see", and furthermore, refers to using a camera and a computer to replace human eyes for performing machine vision, such as recognition, tracking, and measurement, on a target, and further perform graphic processing, so that the computer processes the target into an image more suitable for human eyes to observe, or an image transmitted to an instrument for detection. As a scientific discipline, the computer vision studies related theories and technologies and attempts to establish an AI system that can obtain information from images or multidimensional data. The computer vision technologies generally include technologies such as image processing, image recognition, image semantic understanding, video processing, video semantic understanding, video content/behavior recognition, three-dimensional (3D) object reconstruction, a 3D technology, virtual reality, augmented reality, optical character recognition (OCR), synchronous positioning, and map construction, and further include biometric feature recognition technologies such as common face recognition and fingerprint recognition. The embodiments of the present application mainly relate to an image semantic understanding technology in computer vision, which performs object detection, positioning, and image retrieval based on image semantic understanding, and determines a category of an object included in an image.

The following introduces terms involved in this application.

Object detection: Object detection is one of the classical problems in computer vision, and a location and a category of an object in an image may be predicted by using an object detection technology.

Open data: Open data means that a data category of data processed by a model has not appeared in a training set during application of the model. Usually, a training process of the model is oriented to closed data, that is, both training data and test data belong to the same category range. However, during actual application of the model, it is difficult to limit a category of data processed by the model. Therefore, the model needs to support in processing the open data.

Dual-stream detection: Dual-stream detection means that two task streams are included in a model prediction process, and the two task streams may perform the same task or may respectively perform different tasks. In the embodiments of this application, two task streams are deployed in an object detection model to respectively perform different tasks, and one task stream is used for performing a standard detection task, that is, predicting a location and a category of an object. The other task stream is used for performing a category prediction task. The dual-stream detection facilitates rapid expansion of performance of a detection model and increases an amount of data supported by the model.

Data loading library (DALI): The DALI is a library for data pre-processing and acceleration. The DALI may include a plurality of different types of acceleration libraries to accelerate different data processing phases.

Feature pyramid network (FPN): For semantic features of different resolutions extracted by a convolutional neural network, a low-resolution high-level semantic feature and a high-resolution low-level semantic feature are fused to obtain a better multi-scale expression feature to adapt to detection on objects of different sizes.

Multi-scale feature: The most challenging problem in object detection is the scale variance problem of an object. Shapes and sizes of objects are different, and an extremely small or large object of an extreme shape (such as a slender type or a narrow height type) may appear. This makes it very difficult to identify and locate objects accurately. Both an image pyramid network and a feature pyramid network (FPN) can detect objects of different sizes by using multi-scale features, and the multi-scale features are a plurality of feature images of different scales. An image pyramid is to scale an image to different resolutions and use a same convolutional neural network to extract feature images of different scales for images of different resolutions. Because the image pyramid causes a very large time loss during test and each input image of a different resolution passes through the same convolutional neural network, there is a large amount of redundant calculation. A feature pyramid can input images of a single resolution, but can extract feature images of different resolutions (that is, feature images of different scales). For example, the FPN is a typical neural network that combines multi-scale feature fusion and multi-scale feature prediction.

In the related art, an object detection model is obtained through training based on limited training data sets. However, during actual application, the object detection model needs to detect a large scale of image databases. During actual application, a case in which accuracy of recognizing data in a training data set by the object detection model is high and accuracy of recognizing data in a non-training data set by the object detection model is low occurs easily. Therefore, how to improve accuracy of object detection is an important research direction.

FIG. 1 is a structural block diagram of an object detection system according to an embodiment of this application. The object detection system 100 includes a terminal 110 and an object detection platform 140.

The terminal 110 may be a smartphone, a tablet computer, a notebook computer, a desktop computer, a smart speaker, a smartwatch, or the like, but is not limited thereto. An application supporting object detection is installed and run on the terminal 110. The application may be a social application, an information application, an e-commerce application, or the like. For example, the terminal 110 is a terminal used by a user, and the application program running on the terminal 110 logs in to a user account. The terminal 110 may generally refer to one of a plurality of terminals. In this embodiment, the terminal 110 is merely used as an example for description.

The object detection platform 140 may include at least one of the following: one server, a plurality of servers, a cloud computing platform, or a virtualization center. The object detection platform 140 is configured to provide a background service for the application supporting object detection. In some embodiments, the object detection platform 140 is responsible for detection of a main object, and the terminal 110 is responsible for detection of a secondary object; or the object detection platform 140 is responsible for detection of a secondary object, and the terminal 110 is responsible for detection of a main object; or a distributed computing architecture is used between the object detection platform 140 and the terminal 110 to coordinately detect an object.

In some embodiments, the object detection platform 140 includes: an access server, an object detection server, and a database. The access server is configured to provide an access service for the terminal 110. The object detection server is configured to provide a background service related to object detection. The object detection server can be equipped with a graphics processing unit (GPU) and supports GPU multi-threaded parallel computing. There may be one or more object detection servers. When there are a plurality of object detection servers, at least two object detection servers are configured to provide different services and/or at least two object detection servers are configured to provide the same service, for example, provide the same service in a load balancing manner. This is not limited in this embodiment. The object detection server may be provided with an object detection model and an object retrieval model. During model training and application, the object detection server may be equipped with a GPU and supports GPU parallel computing.

In some embodiments, the server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 may be directly or indirectly connected to the object detection platform 140 in a wired or wireless communication manner. This is not limited in this embodiment.

A person skilled in the art may learn that there may be more or fewer terminals. For example, there may be only one terminal, or there may be dozens, hundreds, or more terminals. In this case, the object detection system further includes other terminals. The quantity and the device types of the terminals are not limited in the embodiments of this application.

The technical solution provided in this embodiment may be applicable to a plurality of object detection scenarios and is combined with a plurality of fields. For example, some social and information applications have a scanning for object recognition function. A terminal device such as a mobile phone installed with such applications can acquire an image of any object through a camera, detect an object based on the acquired image, determine a category of the object, and push information about a similar object or an object of the same category based on a detection result. In such an application scenario, by using an object detection technology, the user can acquire related information through a simple shooting operation and does not need to perform search manually, thereby simplifying a user operation and improving user experience.

Figure 2:
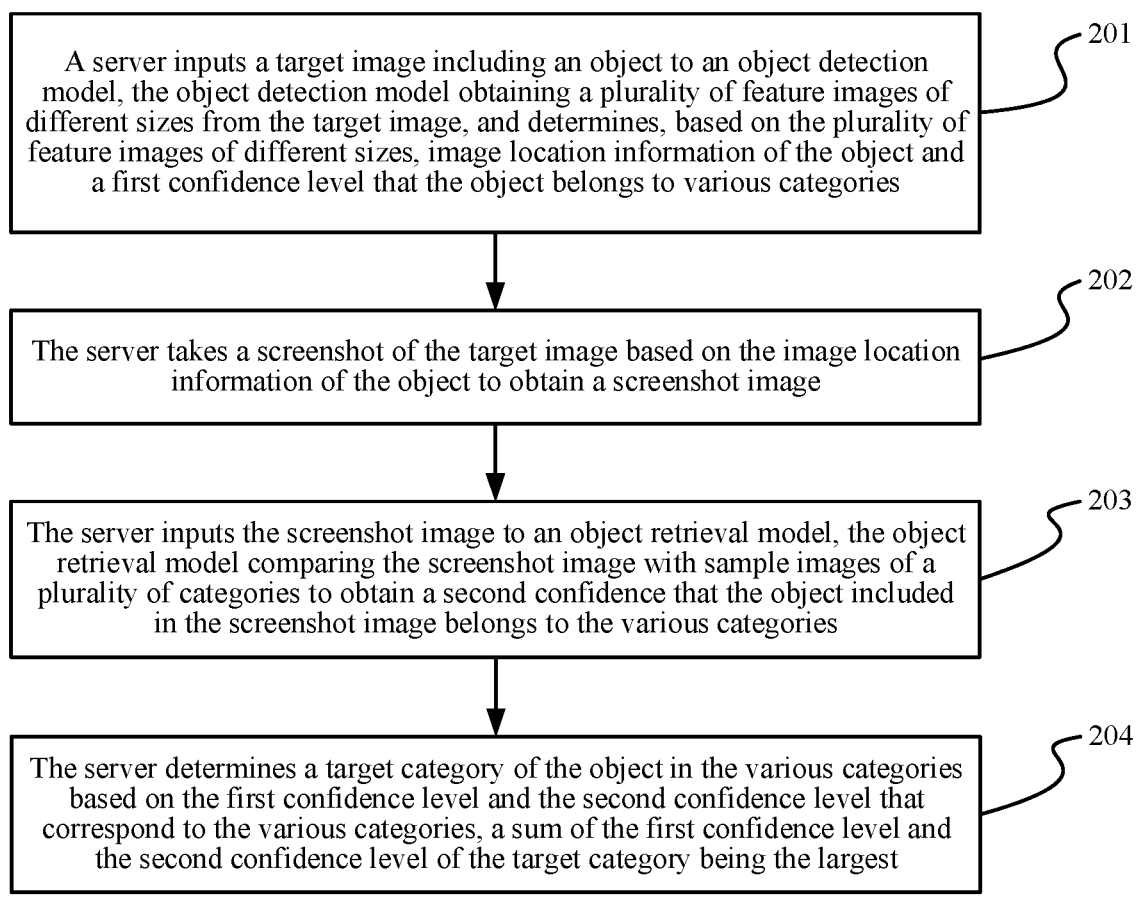
FIG. 2 is a flowchart of an object detection method according to an embodiment of this application.

FIG. 2 is a flowchart of an object detection method according to an embodiment of this application. The method may be applicable to the foregoing implementation environment. In one embodiment, a terminal may send an object detection request and a to-be-detected target image to a server, and the server detects an object in the target image in response to the object detection request and feeds back a detection result to the terminal. In one embodiment, the terminal may detect the target image. In one embodiment, the server may automatically acquire the target image for detection. This is not limited in this embodiment. In this embodiment, an example in which the server performs object detection on the target image is used for description. The server needs to be equipped with an object detection model and an object retrieval model. Object detection is performed by combining the object detection model and the object retrieval model, to improve accuracy of a detection result. As shown in FIG. 2, the object detection method is applied to a computer device. An example in which the computer device is a server is used below for description. This embodiment may include the following steps:

201. A server inputs a target image including an object to an object detection model, so that the object detection model performs feature extraction on the target image to obtain a plurality of feature images of different scales, and determines, based on the plurality of feature images of different scales, image location information of the object and first confidence level that the object belongs to various categories.

The target image may be one or one group of images stored in the server. The group of images may include at least two images. Alternatively, the target image may be an image captured by the server in a video or an image captured by a device with an image capture function in real time. This is not limited in this embodiment. The target image may include at least one object. The object may belong to any category, for example, may be luggage, a household appliance, a book, or food. Categories and a quantity of objects included in the target image are not limited in this embodiment of the application.

Figure 3:
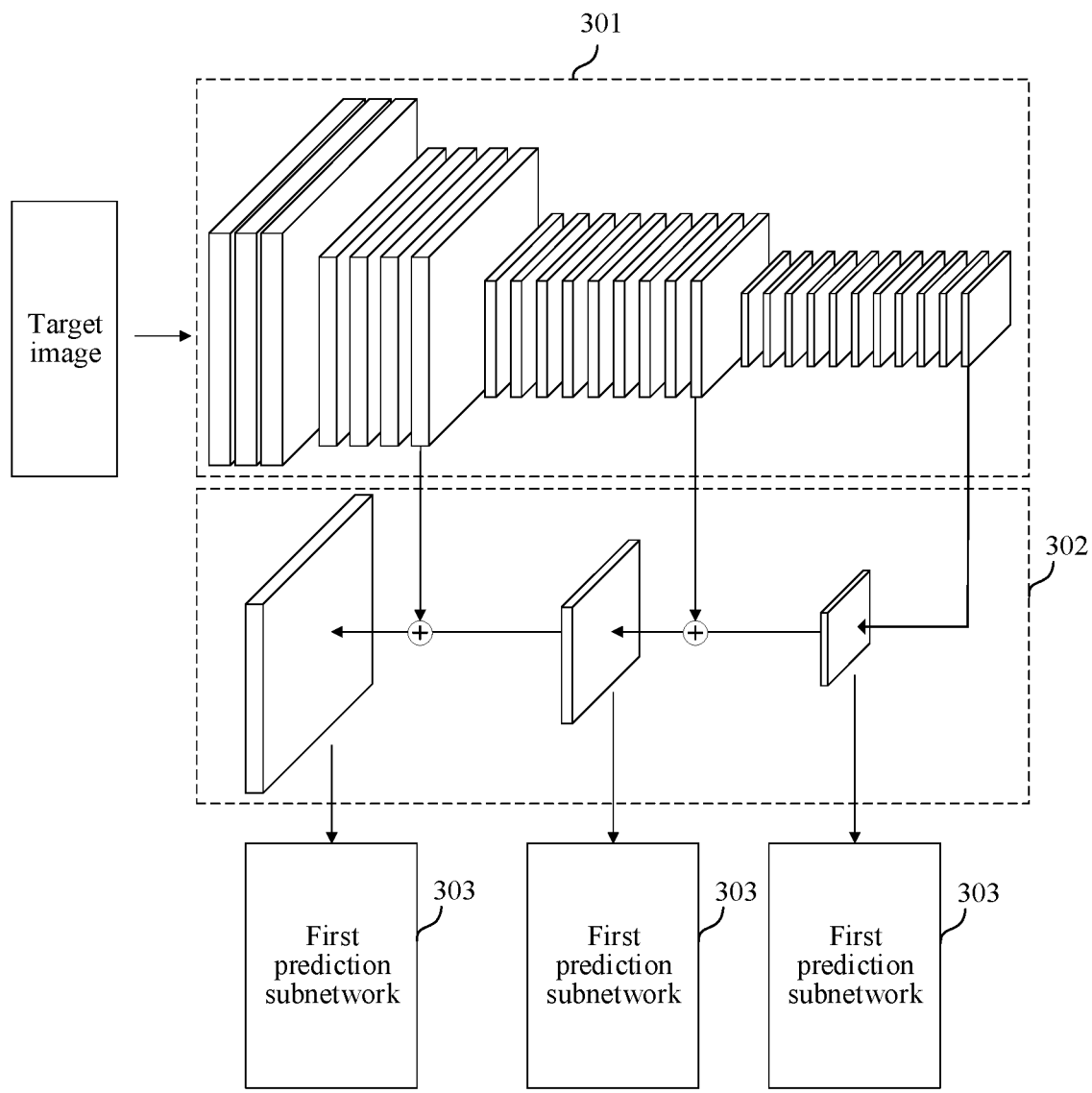
FIG. 3 is a schematic structural diagram of an object detection model according to an embodiment of this application.

In this embodiment, the object detection model may be configured to: perform feature extraction on the target image, and predict a location and a category of each object in the target image based on an extracted image feature. The object detection model may be a model constructed based on a deep neural network, and the deep neural network may be a Retinanet model or the like. FIG. 3 is a schematic structural diagram of an object detection model according to an embodiment of this application. As shown in FIG. 3, the object detection model may include a backbone feature network 301, a feature pyramid network (FPN) 302, and a first prediction subnetwork 303. The backbone feature network 301 may include a plurality of neural networks of different scales, and one neural network may include a plurality of computation layers used for extracting image features. The backbone feature network 301 may extract image features of different scales of the target image through the neural networks. The feature pyramid network 302 may be configured to fuse the image features of different scales to obtain feature images of a plurality of scales. The first prediction subnetwork 303 may predict the location and the category of the object in the target image based on the feature images of different scales. Certainly, the object detection model may further include another unit, for example, an input unit or an output unit. This is not limited in this embodiment. Specific quantities and connection manners of backbone feature networks, feature pyramid networks, and first prediction subnetworks in the object detection model are not limited in this embodiment.

In this embodiment, after the server inputs the target image to the object detection model, the object detection model may analyze and predict the target image by using the backbone feature network, the feature pyramid network, and the first prediction subnetwork, and output the image location information of the object in the target image and the first confidence level that the object belongs to the various categories. The image location information may indicate a location in which a rectangular region in which the object is located is located in the target image. The image location information may include information such as coordinates of a vertex of the rectangular region in which the object is located and lengths of sides of the rectangular region. This is not limited in this embodiment. The first confidence level corresponding to a category may be used for indicating a probability that the object belongs to the category.

202. The server takes a screenshot of the target image based on the image location information of the object to obtain a screenshot image.

Step 202 is an embodiment by using which the server acquires, from the target image based on the image location information of the object, a target region in which the object is located, and the screenshot image is equivalent to the target region acquired by taking a screenshot of an image. In some embodiments, the server may further perform semantic segmentation on the target image, and determine, based on a semantic segmentation graph obtained through segmentation, the target region in which the object is located.

In one embodiment, the server may take a screenshot in the target image based on the image location information of the object, that is, the coordinates of the vertex of the rectangular region in which the object is located, the lengths of the sides of the rectangular region, and the like, to obtain a screenshot image. The screenshot refers to image capturing. A rectangular detection box in which the object is located usually can be determined from the target image based on the image location information of the object, and a screenshot of the rectangular detection box is taken from the target image to obtain the screenshot image.

Usually, one screenshot image may include one object. When stored objects are blocked by each other, one screenshot image may include a plurality of objects. In this case, an object occupying a largest area in the screenshot image is used as a subsequent retrieval target. Certainly, a retrieval target may be determined, in another manner, from the objects included in the screenshot image. This is not limited in this embodiment.

203. The server inputs the screenshot image to the object retrieval model, so that the object retrieval model compares the screenshot image with sample images of a plurality of categories to obtain second confidence level that the object included in the screenshot image belongs to the various categories.

In step 203, an example in which the target region is a screenshot image is used to show one embodiment in which the target region is inputted to the object retrieval model, so that the object retrieval model compares the target region with the sample images of the various categories to obtain the second confidence level that the object included in the target region belongs to the various categories.

The object retrieval model may be a model constructed based on a deep neural network. A specific structure of the object retrieval model is not limited in this embodiment. In this embodiment, the object retrieval model may be connected to an online retrieval database, and the online retrieval database may include sample images of a plurality of categories. After the server inputs the screenshot image to the object retrieval model, the object retrieval model may traverse the sample images of the various categories, determine similarities between the screenshot image and the sample images based on an image feature of the screenshot image and image features of the various sample images, and further determine, based on the similarities between the screenshot image and the sample images of the various categories, the second confidence level that the object belongs to the various categories.

204. The server determines a target category of the object in the various categories based on the first confidence level and the second confidence level that correspond to the various categories, a sum of the first confidence level and the second confidence that correspond to the target category being the largest.

In this embodiment, the server may combine an output result of the object detection model with an output result of the object retrieval model, that is, add the first confidence level and the second confidence level that correspond to the various categories to obtain the category with the largest confidence sum as the target category. In other words, in both the output result of the object detection model and the output result of the object retrieval model, the target category corresponds to larger confidence, and the target category is determined as the category of the object.

In the technical solution provided in this embodiment, an object detection model performs feature extraction on a to-be-detected target image to obtain a plurality of feature images of different scales, and determines, based on the plurality of feature images of different scales, image location information of an object in the target image and first confidence level that the object belongs to various categories. The object detection model initially predicts a category of the object. Then, a screenshot of the target image is taken based on the image location information of the object to obtain a screenshot image. The object retrieval model compares the screenshot image with sample images of a plurality of categories to further predict the category of the object, and acquires second confidence level that the object included in the screenshot image belongs to various categories. The first confidence level and the second confidence level that correspond to the various categories are added, and a category with a largest confidence sum is determined as a target category, that is, the category of the object. By using the foregoing solution, the object detection model and the object retrieval model are combined to perform category prediction on the same object twice, and the object retrieval model modifies the output result of the object detection model, thereby effectively improving accuracy of the prediction result.

Figure 4:
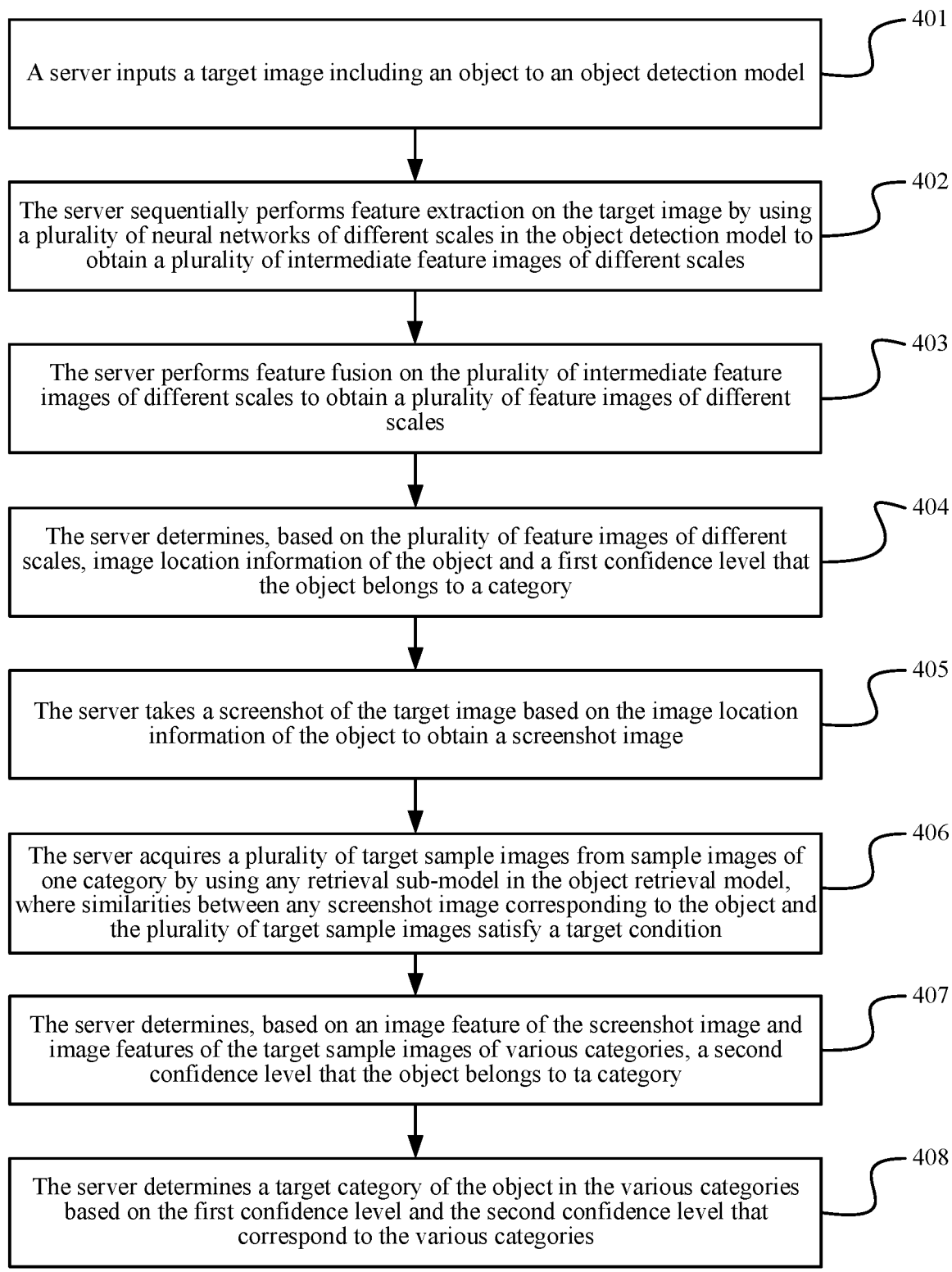
FIG. 4 is a specific flowchart of an object detection method according to an embodiment of this application.

The foregoing embodiment is merely a brief description of an implementation of this application. FIG. 4 is a specific flowchart of an object detection method according to an embodiment of this application. With reference to FIG. 4, the foregoing object detection process is described in detail by using a server as an execution entity.

401. The server inputs a target image including an object to an object detection model.

In one embodiment, the server may input the to-be-detected target image to the object detection model based on an object detection instruction. The object detection instruction may be triggered by any user. For example, a target application supporting a scanning for object recognition function may be installed and run on a terminal device used by any user. When detecting that the user triggers the scanning for object recognition function, the terminal may turn on a camera, and the user photographs the target image, or locally stored images are displayed and the user selects the target image from the locally stored images. A specific manner for acquiring the target image is not limited in this embodiment. After determining that photographing or selection of the target image is completed, the user may trigger the object detection instruction. The terminal may send the target image and the object detection instruction to the server. The server may input the target image to the object detection model in response to the object detection instruction. In some embodiments, the object detection instruction carries the target image. In this case, the terminal may send the object detection instruction only to the server. The server obtains the target image through analysis in response to the object detection instruction, and inputs the target image to the object detection model.

In this embodiment, the server may input a target image of any size to the object detection model, or may input the target image to the object detection model after adjusting the target image to a preset size. In one embodiment, before inputting the target image to the object detection model, the server may scale the target image based on an actual situation to adjust the target image to the preset size. The preset size may be set by a developer.

In one embodiment, the server may pre-process the target image, and input the pre-processed target image to the object detection model for a subsequent computation process. For example, the pre-processing process may include converting the target image into a digital matrix based on a pixel value of each location in the target image, and may further include processing steps such as image enhancement and noise removal to enhance useful information in the target image. Specific steps of the pre-processing process are not limited in this embodiment. Certainly, the pre-processing process may alternatively be performed by the object detection model. This is not limited in this embodiment.

402. The server sequentially performs feature extraction on the target image by using a plurality of neural networks of different scales in the object detection model to obtain a plurality of intermediate feature images of different scales.

In this embodiment, feature extraction may be performed on the target image by using a backbone feature network in the object detection model. The backbone feature network may be constructed based on a deep neural network. For example, the deep neural network may be a visual geometry group network (VGGNet) or a residual neural network (ResNet). This is not limited in this embodiment. The backbone feature network may include a plurality of convolution layers of different scales. The server may perform convolution operation on the digital matrix corresponding to the target image by using the plurality of convolution layers of different scales to extract an image feature of the target image.

In one embodiment, a size of a convolution kernel included in each computation layer in each neural network and a movement step of the convolution kernel may be adjusted to control a scale of a feature image outputted by each neural network. For example, a larger convolution kernel and a larger movement step indicate a smaller scale of an outputted feature image. A specific quantity of neural networks, a specific quantity of computation layers in a neural network, and the size and the movement step of the convolution kernel may all be set by a developer, and are not limited in this embodiment. In this embodiment, the neural networks may be cascading. A first intermediate feature image of a first scale outputted by the last computation layer in a previous neural network of any one of the plurality of neural networks of different scales may be acquired, and downsampling and feature extraction are performed on the first intermediate feature image to obtain a second intermediate feature image of a second scale. The second scale is less than the first scale. Specific values of the first scale and the second scale are not limited in this embodiment. In some embodiments, the foregoing process of acquiring the intermediate feature image is described by using two neural networks of different scales as an example. First, the server may perform feature extraction on the target image through various computation layers in a neural network of a first scale, where scales of image features extracted by the various computation layers are the same; and generate the first intermediate feature image of the first scale based on an image feature extracted by the last computation layer in the neural network of the first scale. Then, the server inputs the first intermediate feature image to a neural network of a second scale, so that a computation layer in the neural network of the second scale performs downsampling on the first intermediate feature image to reduce the scale of the feature image, and further performs feature extraction on the first intermediate feature image obtained after downsampling. Finally, the server acquires a feature image outputted by the last computation layer in the neural network of the second scale as the second intermediate feature image of the second scale.

The foregoing convolution operation process is described by using one convolution layer as an example. One convolution layer may include one or more convolution kernels, each convolution kernel corresponds to one scanning window, and a size of the scanning window is the same as a size of the convolution kernel. In a process in which the convolution kernel performs convolution operation, the scanning window may slide on an intermediate feature image at a target step to sequentially scan each region of the intermediate feature image, where the target step may be set by a developer. One convolution kernel is used as an example. In the convolution operation process, when a scanning window of the convolution kernel slides to any region of an intermediate feature image, the server reads a value corresponding to each feature point in the region, performs point multiplication operation on the convolution kernel and the value corresponding to each feature point, then accumulates all products, and uses an accumulated sum as a feature point. Subsequently, the scanning window of the convolution kernel slides to a next region of the intermediate feature image at the target step, and convolution operation is performed again to output a feature point, until all regions of the intermediate feature image are scanned. All outputted feature points form a new intermediate feature image as an input to a next convolution layer. A specific quantity of convolution layers may be set by a developer, and is not limited in this embodiment.

The foregoing description of the method for acquiring a multi-scale intermediate feature image is merely an exemplary description. A specific method for acquiring a plurality of intermediate feature images of different scales is not limited in this embodiment.

By using the foregoing technical solution, intermediate feature images of different scales are acquired in an image feature extraction process, and information about images of different resolutions can be reserved, so that the server can perform a subsequent object detection step based on the multi-scale image feature, thereby improving accuracy of an object detection result.

403. The server performs feature fusion on the plurality of intermediate feature images of different scales to obtain a plurality of feature images of different scales.

In this embodiment, feature fusion may be performed on the intermediate feature images of different scales through a feature pyramid network in the object detection model. In one embodiment, a first intermediate feature image of a first scale outputted by a previous neural network may be acquired through the feature pyramid network for a second intermediate feature image of the second scale outputted by any neural network. Upsampling is performed on the second intermediate feature image based on the first scale to obtain the second intermediate feature image of the first scale. Certainly, in this process, convolution processing may further be performed on the second feature image through the convolution layer to further extract an image feature. This is not specifically limited in this embodiment. A specific upsampling method is not limited in this embodiment. The feature pyramid network may perform feature fusion on the second intermediate feature image of the first scale and the first intermediate feature image of the first scale to obtain a feature image of the first scale, for example, may add elements at the same location in the second intermediate feature image of the first scale and the first intermediate feature image of the first scale to obtain the feature image of the first scale. Certainly, feature fusion may alternatively be performed in another manner. For example, elements at the same location in the second intermediate feature image of the first scale and the first intermediate feature image of the first scale are multiplied to obtain the feature image of the first scale. This is not limited in this embodiment.

In this embodiment, feature fusion is performed on intermediate feature images of different scales, so that a feature image can include a high-level semantic feature and a low-level semantic feature. When the object detection model performs object detection based on a multi-scale feature image, adaptability of detection on objects of different scales can be improved, and a problem that an object of a small scale is ignored because only the high-level semantic feature is relied on is avoided.

404. The server determines, based on the plurality of feature images of different scales, image location information of the object and first confidence level that the object belongs to various categories.

In this embodiment, a location and a category of the object may be predicted through a first prediction subnetwork in the object detection model. The first prediction subnetwork may include a category prediction subnetwork and a location prediction subnetwork. The category prediction subnetwork and the location prediction subnetwork each may include a plurality of computation layers, for example, convolution layers. Certainly, an activation function layer or the like may further be connected after each convolution layer. Specific structures of the category prediction subnetwork and the location prediction subnetwork are not limited in this embodiment.

Figure 5:
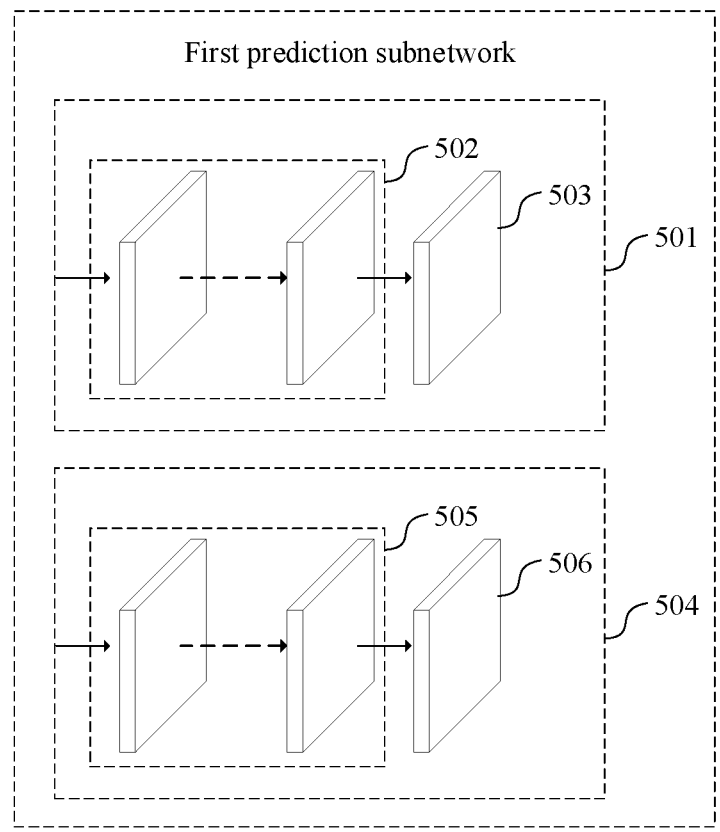
FIG. 5 is a schematic diagram of a first prediction subnetwork according to an embodiment of this application.

In one embodiment, the server may perform convolution operation on any one of the plurality of feature images of different scales by using the category prediction subnetwork in the object detection model to obtain a category matrix corresponding to the target image, where the category matrix is used for indicating the first confidence level that the object in the target image belongs to the various categories; and perform convolution operation on any one of the plurality of feature images of different scales by using a location prediction subnetwork in the object detection model to obtain a location information matrix corresponding to the target image, where the location information matrix is used for indicating the image location information of the object in the target image. FIG. 5 is a schematic diagram of a first prediction subnetwork according to an embodiment of this application. A category prediction subnetwork 501 may include a plurality of W*H*256 convolution layers 502 and one W*H*KA convolution layer 503. A location prediction subnetwork 504 may include a plurality of W*H*256 convolution layers 505 and one W*H*4A convolution layer 506. W, H, K, and A are positive integers. Specific values of W and H may be set by a developer. K may represent a quantity of categories that may be predicted by the object detection model. A may represent a quantity of detection boxes. In some embodiments, with reference to FIG. 5, a process of predicting the first category and the image location information is described. The object detection model may set A anchors (detection boxes) of different sizes in any feature image. After convolution operation is performed on the feature image through the convolution layer in the category prediction subnetwork, each detection box may be mapped into a K-dimensional vector. Each value in the K-dimensional vector may represent first confidence level that an object in the detection box belongs to various categories. After convolution operation is performed on the feature image through the convolution layer in the location prediction subnetwork, each detection box may be mapped into a four-dimensional vector. The four-dimensional vector may include location coordinates of a vertex of the detection box and lengths of sides of the detection box. The server may determine the image location information of the object by using the four-dimensional vector.

Step 401 to step 404 are steps in which a target image including an object is inputted to an object detection model, so that the object detection model performs feature extraction on the target image to obtain a plurality of feature images of different scales, and determines, based on the plurality of feature images of different scales, image location information of the object and first confidence level that the object belongs to various categories. In this embodiment, by extracting a multi-scale feature image and fusing feature image of different scales, an image feature with a high resolution can be fully reserved, so that image features of different resolutions are fully fused, and the model has better feature expression capability, thereby improving accuracy of object detection.

405. The server takes a screenshot of the target image based on the image location information of the object to obtain a screenshot image.

Step 405 is one embodiment by using which the server acquires, from the target image based on the image location information of the object, a target region in which the object is located, and the screenshot image is equivalent to the target region acquired by taking a screenshot of an image. In some embodiments, the server may further perform semantic segmentation on the target image, and determine, based on a semantic segmentation graph obtained through segmentation, the target region in which the object is located.

In this embodiment, the server may take a screenshot in the target image based on the information such as the coordinates of the vertex and the lengths of the sides in the image location information to obtain a screenshot image. One screenshot image may include one object. The screenshot refers to image capturing. A rectangular detection box in which the object is located usually can be determined from the target image based on the image location information of the object, and a screenshot of the rectangular detection box is taken from the target image to obtain the screenshot image.

In this embodiment, by taking a screenshot image including only the object and performing a subsequent object retrieval step based on the screenshot image, the object retrieval model can focus more on the object in a retrieval process and is not interfered with by irrelevant information, thereby improving accuracy of object retrieval.

406. The server acquires a plurality of target sample images from sample images of one category by using any retrieval sub-model in the object retrieval model, where similarities between any screenshot image corresponding to the object and the plurality of target sample images satisfy a target condition.

In step 406, an example in which the target region is a screenshot image is used to show one embodiment in which the server acquires a plurality of target sample images from sample images of one category by using any retrieval sub-model in the object retrieval model, where similarities between any target region corresponding to the object and the plurality of target sample images satisfy a target condition.

In this embodiment, the object retrieval model includes a plurality of retrieval sub-models, and one retrieval sub-model may be configured to compare the screenshot image corresponding to the object with sample images of one category, that is, one retrieval sub-model may be configured to compare the target region corresponding to the object with sample images of one category.

In one embodiment, one retrieval sub-model may be associated with sample libraries of one category in an online retrieval database. The sample libraries of one category may include a plurality of sample images, each sample image may correspond to one image index, and the image index may be used for indicating an image feature of the sample image. Different sample images correspond to different image indexes.

When performing image retrieval, the retrieval sub-model may calculate an image index of the screenshot image. For example, first, a size of the screenshot image may be scaled down, and colors of the screenshot image obtained after being scaled down are simplified to obtain a 64-level grayscale image. Then, a grayscale average value of each pixel is calculated, and a grayscale of each pixel is compared with the grayscale average value. When a grayscale of a pixel is greater than or equal to the grayscale average value, the pixel may be denoted as 1; and when a grayscale of a pixel is less than the grayscale average value, the pixel may be denoted as 0, to obtain a 64-bit integer. Finally, a hash value is determined as an image index of the screenshot image based on the 64-bit integer. The foregoing description of the method for acquiring an image index is merely an exemplary description. A specific method for acquiring the image index of the screenshot image is not limited in this embodiment.

After acquiring the image index of the screenshot image, the retrieval sub-model may determine a Hamming distance between the image index of the screenshot image and an image index of each sample image. The Hamming distance may be used for indicating a similarity between the screenshot image and a sample image. Usually, a smaller Hamming distance indicates a higher similarity between images. The server may acquire a plurality of sample images as target sample image, where similarities between the plurality of sample images and the screenshot image satisfy a target condition. For example, the target condition may be the first Y sample images sorted in descending order of similarities between the sample images and the screenshot image, that is, the server may determine Y sample images most similar to the screenshot image as the target sample images, where Y is a positive integer, and a specific value of Y may be set by a developer. Certainly, the target condition may alternatively be set to other content. For example, the target condition may alternatively be that a similarity between a sample image and the screenshot image is greater than a similarity threshold, and the similarity threshold is any value greater than 0. For example, the similarity threshold is 80%. This is not limited in this embodiment.

In this embodiment, the image retrieval step is performed based on the online retrieval database with a large scale of samples. Compared with an amount of training data in the object detection model being approximately one million, a quantity of samples in the online retrieval database may reach approximately one billion, which is far greater than the amount of training data in the object detection model. Query may be performed more precisely based on a large scale of sample data to find a target sample image similar to the screenshot image, thereby obtaining a more precise object detection result.

407. The server determines, based on an image feature of the screenshot image and image features of the target sample images of various categories, the second confidence level that the object belongs to the various categories.

In step 407, an example in which the target region is a screenshot image is used to show one embodiment in which the server determines, based on an image feature of the target region and image features of the target sample images of various categories, the second confidence level that the object belongs to the various categories.

In this embodiment, the server determines distances between the screenshot image and the target sample images of the various categories based on the image feature of the screenshot image and the image features of the target sample images of the various categories; and then determines, based on the distances between the screenshot image and the target sample images of the various categories, the second confidence level that the object belongs to the various categories.

In the foregoing process, an example in which the target region is a screenshot image is used to show one embodiment in which the server determines distances between the target region and the target sample images of the various categories based on the image feature of the target region and the image features of the target sample images of the various categories; and then determines, based on the distances between the target region and the target sample images of the various categories, the second confidence level that the object belongs to the various categories.

In one embodiment, the object retrieval model may further include one universal retrieval model configured to calculate a distance between images. The universal retrieval model may extract an image feature, and further determine the distance between the images based on the image feature. A specific result of the universal retrieval model is not limited in this embodiment. In this embodiment, the server may extract image features of the screenshot image and various sample images by using the universal retrieval mode, determine a difference between image features of two images based on the image features, determine a distance between the two images, and further determine distances between the screenshot image and sample images of a category. In some embodiments, the process may be expressed as the following formula (1):

$$d(q, c_m) = \sum_{i=1}^{Y} \|f(q) - f(c_{m,i})\|_2^2 \quad (1)$$

where q may represent a screenshot image, $c_m$ may represent an $m^{th}$ category, $c_{m,i}$ may represent an $i^{th}$ target sample image in the $m^{th}$ category, $d(q,c_m)$ may represent a distance between the screenshot image q and the category $c_m$, f( ) may represent a universal retrieval model, and f(q) and $f(c_{m,i})$ may respectively represent an image feature of the screenshot image q and an image feature of the target sample image $c_{m,i}$.

In one embodiment, the server may determine, based on distances between the screenshot image and various categories, probabilities that the screenshot image belongs to the various categories, that is, the second confidence level that the screenshot image belongs to the various categories. In some embodiments, the process may be expressed as the following formula (2):

$$\text{score}(q, c_m) = \frac{\exp(-d(q, c_m))}{\sum_{m=1}^{M} \exp(-d(q, c_m))} \quad (2)$$

where $\text{score}(q,c_m)$ may represent a probability that the screenshot image q belongs to the category $c_m$, M may represent a quantity of all categories, and $d(q,c_m)$ may represent the distance between the screenshot image q and the category $c_m$.

In this embodiment, the server may compare the probabilities that the screenshot image belongs to the various categories, that is, compare the second confidence level corresponding to the various categories, and acquire a category corresponding to the largest second confidence level as a second category.

Step 406 and step 407 are steps in which the screenshot image is inputted to the object retrieval model, so that the object retrieval model compares the screenshot image with sample images of a plurality of categories to obtain second confidence level that the object included in the screenshot image belongs to the various categories. In other words, an example in which the target region is a screenshot image is used to show a process in which the target region is inputted to the object retrieval model, so that the object retrieval model compares the target region with the sample images of the various categories to obtain the second confidence level that the object included in the screenshot image belongs to the various categories. In this embodiment, the object retrieval model performs retrieval and classification based on an online database with a large amount of data, so that an amount of data supported by an object detection technology is expanded, and the object retrieval model modifies an output result of the object detection model, thereby improving accuracy of the detection result.

408. The server determines a target category of the object in the various categories based on the first confidence level and the second confidence level that correspond to the various categories.

A sum of the first confidence level and the second confidence level that correspond to the target category is the largest.

In this embodiment, the server may add the first confidence level and the second confidence level that correspond to the various categories to obtain confidence sums corresponding to the various categories, and use a category with a largest confidence sum as the target category, that is, the category of the object. In some embodiments, the process may be expressed as the following formula (3):

$$c = \arg\max_{c}(score_{detection}(q, c_m) + score_{retrieval}(q, c_m)) \quad (3)$$

where c may represent the target category, $score_{detection}(q,c_m)$ may represent first confidence level outputted by the object detection model, and $score_{retrieval}(q,c_m)$ may represent second confidence level outputted by the object retrieval model.

Figure 6:
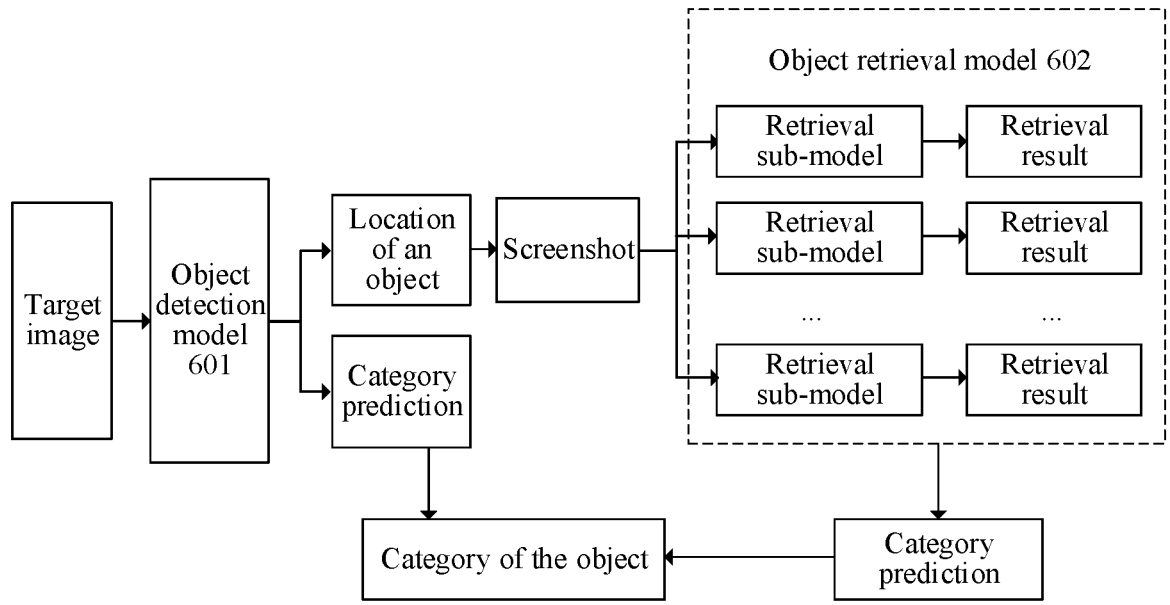
FIG. 6 is a schematic structural diagram of an object detection model and an object retrieval model according to an embodiment of this application.

FIG. 6 is a schematic structural diagram of an object detection model and an object retrieval model according to an embodiment of this application. The object detection model 601 may predict a location and a category of the object in the target image. A server may take a screenshot of the target image based on the predicted location of the object and input a screenshot image to the object retrieval model 602, so that the object retrieval model 602 further predicts a category of the object. Then, prediction results of the object detection model and the object retrieval model are combined to determine the category of the object.

In the technical solution provided in this embodiment, an object detection model performs feature extraction on a to-be-detected target image to obtain a plurality of feature images of different scales, and determines, based on the plurality of feature images of different scales, image location information of an object in the target image and first confidence level that the object belongs to various categories. The object detection model initially predicts a category of the object. Then, a screenshot of the target image is taken based on the image location information of the object to obtain a screenshot image. The object retrieval model compares the screenshot image with sample images of a plurality of categories to further predict the category of the object, and acquires second confidence level that the object included in the screenshot image belongs to various categories. The first confidence level and the second confidence level that correspond to the various categories are added, and a category with a largest confidence sum is determined as a target category, that is, the category of the object. By using the foregoing solution, the object detection model and the object retrieval model are combined to perform category prediction twice, and the object retrieval model modifies the output result of the object detection model, thereby effectively improving accuracy of the prediction result.

Figure 7:
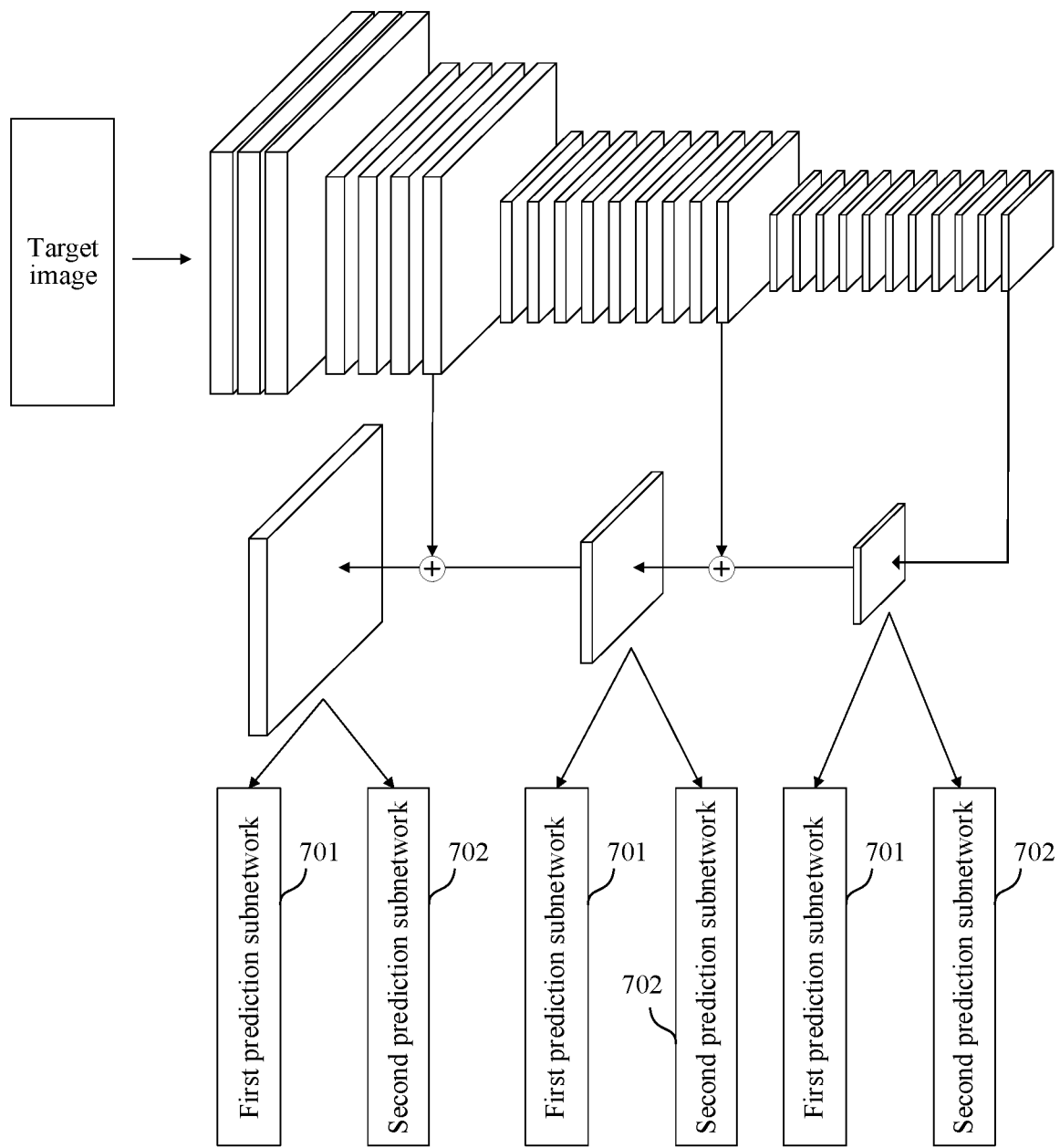
FIG. 7 is a schematic diagram of an object detection model according to an embodiment of this application.

In the foregoing embodiment, the location and the category of the object are predicted by using the first prediction subnetwork in the object detection model. The first prediction subnetwork needs to accurately mark locations and categories of all objects in a used training sample in a model training phase. The sample mark process is time-consuming and laborious, and a quantity of acquired training samples is small. Consequently, a data detection range supported by the object detection model is small. In addition, costs of adding a new training sample are extremely high. As a result, it is difficult to expand the data detection range supported by the object detection model. In this embodiment, to overcome this problem and enable the object detection model to rapidly expand the detection range, a second prediction subnetwork parallel to the first prediction subnetwork is added to the object detection model to implement dual-stream detection. One stream is a standard detection stream, that is, the first prediction subnetwork configured to predict a location and a category of an object. One stream is a classification stream, that is, the second prediction subnetwork focusing merely on category prediction of the object. FIG. 7 is a schematic diagram of an object detection model according to an embodiment of this application. The object detection model includes a first prediction subnetwork 701 and a second prediction subnetwork 702.

In this embodiment, the second prediction subnetwork predicts only a category of an object, and does not pay attention to a location of the object. Therefore, the second prediction subnetwork marks merely a category of an object included in a sample image in a used training sample in a model training phase. In this case, sample mark costs are greatly reduced, and the second prediction subnetwork can easily acquire a larger scale of training data. By using a large amount of training data, a detection range of the second prediction subnetwork can be rapidly expanded, that is, a detection range of the object detection model can be rapidly expanded. In this embodiment, because amounts of data of training samples are different, object detection ranges supported by the first prediction subnetwork and the second prediction subnetwork are also different. The first prediction subnetwork may be configured to predict a location and a category of an object belonging to a first category range, the second prediction subnetwork may be configured to predict a category of an object belonging to a second category range, and the second category range is greater than the first category range.

In this embodiment, the second prediction subnetwork may predict the category of the object based on a global image. In one embodiment, after the object detection model performs feature extraction on the target image to obtain a plurality of feature images of different scales, the object detection model may separately pool the plurality of feature images of different scales by using the second prediction subnetwork to obtain a plurality of global category prediction matrices. Values in the global category prediction matrices may be used for indicating confidence that the object included in the target image belongs to various categories. The object detection model may determine, based on the plurality of global category prediction matrices, a category of the object, belonging to the second category range, in the target image. For example, global category prediction matrices corresponding to feature images of different scales may be fused to obtain a global prediction matrix, and the category of the object is determined based on a value in the global prediction matrix. The foregoing description of the process in which the second prediction subnetwork performs category prediction is merely an exemplary description. A specific method used by the second prediction subnetwork for category prediction is not limited in this embodiment.

Figure 8:
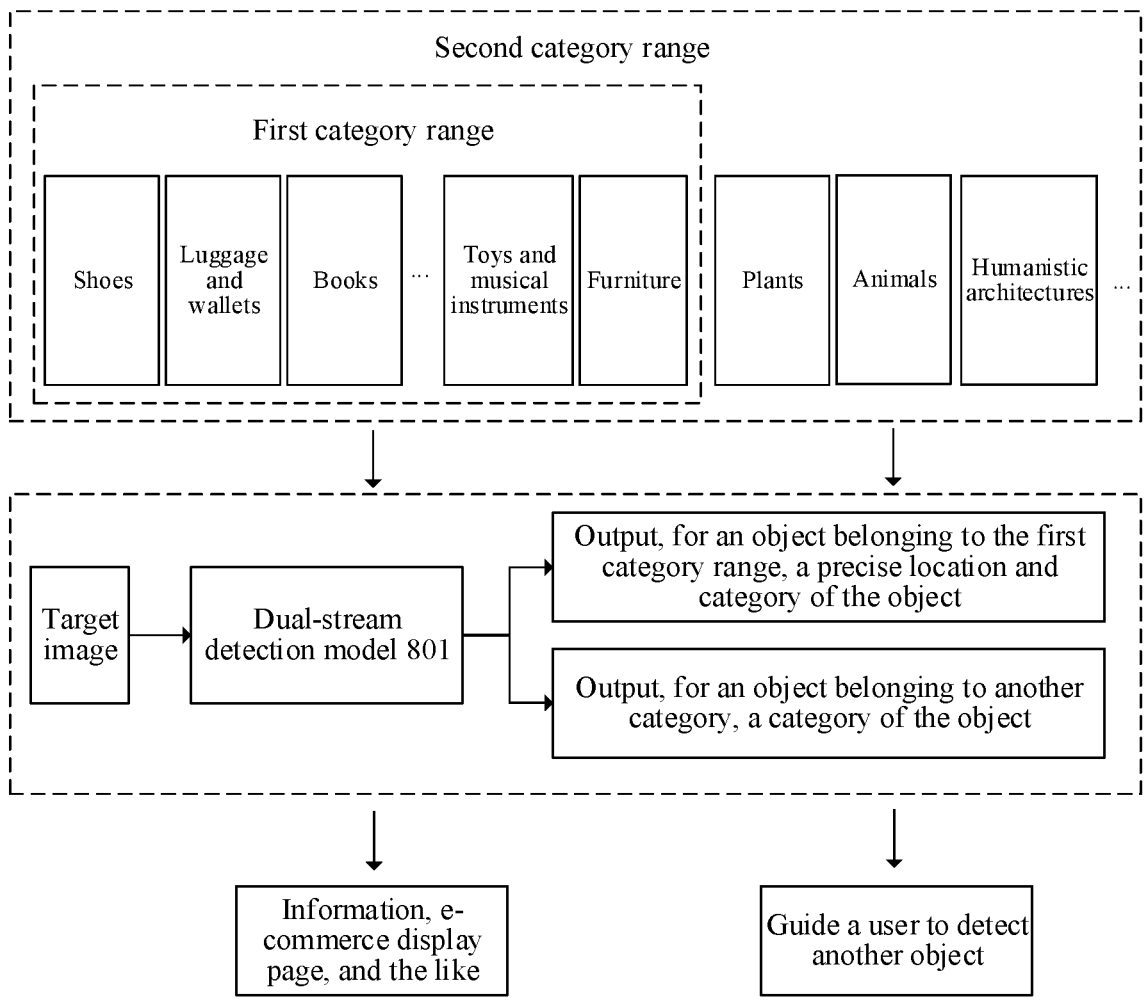
FIG. 8 is a schematic diagram of a dual-stream detection application according to an embodiment of this application.

FIG. 8 is a schematic diagram of a dual-stream detection application according to an embodiment of this application. As shown in FIG. 8, the dual-stream object detection model 801 may support detection on data in a second category range. The second category range includes a first category range, that is, a category supporting precise detection. The second category range may further include another category, that is, a category that does not support precise detection currently. A precise location and category of an object belonging to the first category range can be outputted by using the dual-stream detection the model 801 to facilitate a subsequent recognition process. In addition, information about such an object, an e-commerce display page, and the like may be displayed based on a recognition result. For an object belonging to another category, a category of the object may be outputted to facilitate filtering and statistics collection of recognition behavior of a user and guide the user to detect another object. For example, when this solution is applicable to a target application having a scanning for object recognition function, a terminal on which the target application is installed and run may capture an image of a to-be-recognized object by using a camera. The dual-stream object detection model performs object detection. For an object whose category can be recognized, a purchase link, information, and the like that are related to the object may be pushed to a user on a detection result view page. For an object whose category cannot be recognized, a category of the object may be displayed on the detection result view page, and the user is prompted that recognition of an object of this category is not supported currently and is guided to scan another object. In this embodiment, an amount of detection data of a model can be rapidly expanded by using the dual-stream detection technology, so that the model can detect objects of more categories, that is, the model can support open data and provide more information feedbacks for the user, thereby improving user experience. Certainly, a detection stream may further be added based on dual-stream detection to implement multi-stream detection, so as to obtain richer detection results. This is not limited in this embodiment.

Figure 9:
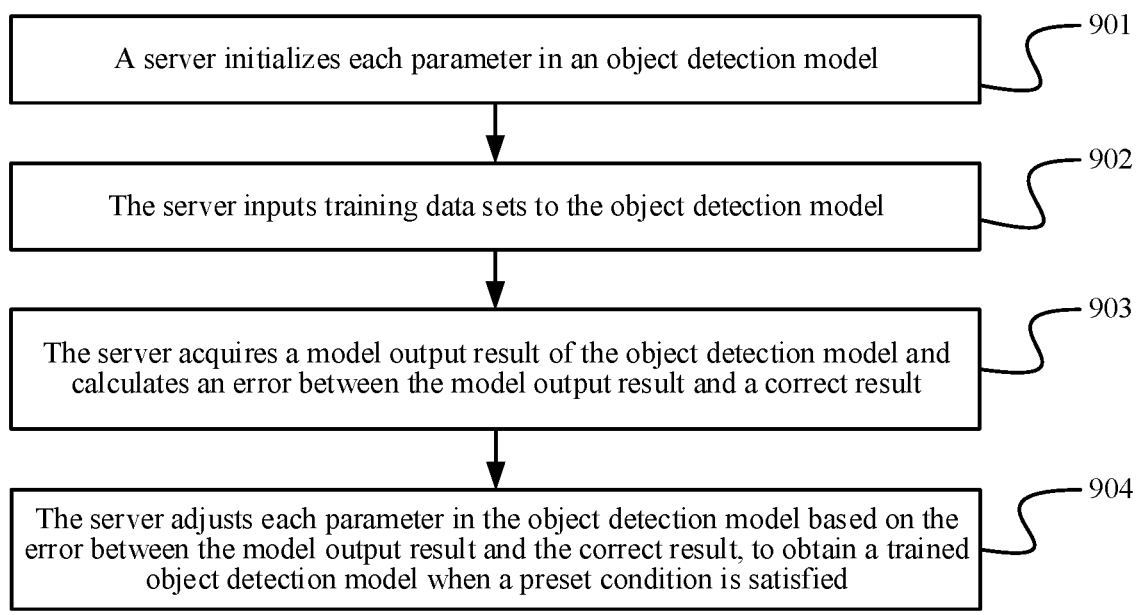
FIG. 9 is a flowchart of a method for training an object detection model according to an embodiment of this application.

The foregoing mainly describes the process in which the object detection model predicts the category of the object by using the first prediction subnetwork and the second prediction subnetwork. Before performing prediction, the object detection model needs to be trained. FIG. 9 is a flowchart of a method for training an object detection model according to an embodiment of this application. As shown in FIG. 9, the method specifically includes the following steps:

901. A server initializes each parameter in the object detection model.

The server may randomly assign each parameter in a computation layer such as a convolution layer, a fully-connected layer, or a pooling layer in the object detection model to implement parameter initialization. In one embodiment, the server may initialize the parameter in the object detection model by using a Gaussian distribution with a variance of 0.01 and a mean of 0.

The foregoing description of the method for initializing the object detection model is merely an exemplary description. A specific model initialization method is not limited in this embodiment.

902. The server inputs training data sets to the object detection model.

The training data sets may include a first training data set and a second training data set. A location and a category of each object are marked in an image in the first training data set. The first training data set may be used for training the first prediction subnetwork. Only a category of each object is marked in an image in the second training data set. The second training data set may be used for training the second prediction subnetwork.

The server may input images in the training data sets to the object detection model, so that the object detection model performs a subsequent object detection step.

903. The server acquires a model output result of the object detection model and calculates an error between the model output result and a correct result.

In this embodiment, the server may determine the error between the model output result and the correct result based on a plurality of loss functions. In one embodiment, an error between an output result of a category prediction subnetwork in the first prediction subnetwork and a correct classification result may be calculated by using a focal loss function. In some embodiments, the focal loss function may be expressed as the following formula (4):

$$\text{FocalLoss}(p_t) = -\alpha_t(1-p_t)^\gamma \log(p_t) \quad (4)$$

t may represent a $t^{th}$ detection box, $\alpha_t$ may represent a sample weight and a value thereof may be set by a developer, $p_t$ may represent the output result of the category prediction subnetwork, that is, a probability that an object in the detection box belongs to a correct category, and $\gamma$ may represent a weight used for adjusting difficult and easy samples. For example, when $p_t$ is relatively large, it indicates that a difficult of correctly predicting a category of the object by the model is low, and in this case, the model may pay less attention to this type of samples, that is, $(1-p_t)^\gamma$ decreases; when $p_t$ is relatively small, it indicates that a difficult of correctly predicting a category of the object by the model is high, and in this case, the model may pay more attention to this type of samples, that is, $(1-p_t)^\gamma$ increases. In this embodiment, by adjusting weights of difficult and easy samples, a problem of unbalanced difficult and easy samples in an image training process can be relieved, and a weight occupied by easy samples in the training process is reduced.

In one embodiment, an error between an output result of a location prediction subnetwork in the first prediction subnetwork and a correct location may be calculated by using a SmoothL1 loss function. In some embodiments, the SmoothL1 may be expressed as the following formula (5):

$$SmoothL1 = \begin{cases} 0.5x^2, & \text{if } |x| < 1 \\ |z| - 0.5, & \text{otherwise} \end{cases} \quad (5)$$

x may represent a difference between the output result of the location prediction subnetwork and the correct location. In this embodiment, by using the Smooth L1 loss function, an L1 loss function and an L2 loss function may be combined. When the difference between the output result of the location prediction subnetwork and the correct location is large, the L1 loss function is used in an initial model training phase, so that model training is not severely interfered with by an outlier, thereby facilitating model training. When the difference between the output result of the location prediction subnetwork and the correct location is small, that is, in a model convergence phase, the L2 loss function is used to increase sensitivity to an abnormal point, so that the model can have a more stable output.

In one embodiment, an error between an output result of the second prediction subnetwork and a correct classification result may be calculated by using a binary cross entropy (BCE) loss function. In some embodiments, the BCE loss function may be expressed as the following formula (6):

$$BCE = \frac{1}{N} \sum_{i=1}^{N} \sum_{c=1}^{C} (y_{i,c} \log(f(x_i)) + (1 - y_{i,c}) \log(1 - f(x_i))) \quad (6)$$

N may represent a quantity of objects in an image. C may represent a quantity of categories that may be predicted by the object detection model. $y_{i,c}$ may represent whether a sample belongs to a category c. If the sample belongs to the category c, a value of $y_{i,c}$ is 1. If the sample does not belong to the category c, a value of $y_{i,c}$ is 0. $x_i$ may represent an image feature of a sample i. $f(x_i)$ may represent the image feature a sigmoid (which is a logic regression function) expression, and $$f(x_i) = \frac{1}{1 + \exp(-x_i)}.$$

904. The server adjusts each parameter in the object detection model based on the error between the model output result and the correct result, to obtain a trained object detection model when a preset condition is satisfied.

In one embodiment, the server may compare each error with each error threshold. When the error is greater than the preset threshold, the server may propagate the error back to the object detection model, and then solve each parameter in the object detection model. The plurality of error thresholds may all be set by a developer, and a quantity of error thresholds is the same as a quantity of acquired errors.

When the error is less than the preset threshold, it is determined that the object detection model has outputted the correct detection result, and the server may continue to read a next group of images and perform step 903. If a quantity of correct model output results acquired by the server reaches a target quantity or a quantity of times of traversing the training data set reaches a target quantity of times, it may be determined that training of the object detection model is completed, that is, the preset condition is satisfied. The target quantity and the target quantity of times both may be set by a developer, and specific content of the preset condition may be set by a developer. This is not limited in this embodiment.

The foregoing embodiment mainly describes the application process and the training process of the object detection model. In an actual application scenario, an amount of data carried by the object detection model is extremely large, and high concurrent requests need to be supported. In this embodiment, each module in the object detection model may be accelerated to improve a data processing capability of the object detection model.

Figure 10:
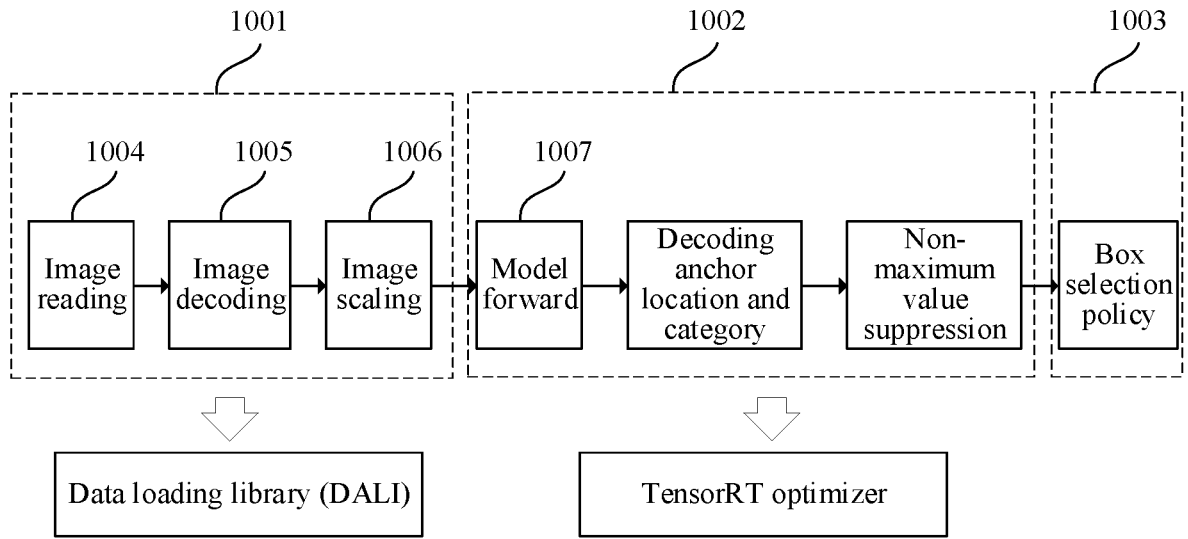
FIG. 10 is a schematic diagram of a method for accelerating an object detection model according to an embodiment of this application.

FIG. 10 is a schematic diagram of a method for accelerating an object detection model according to an embodiment of this application. The method for accelerating an object detection model mainly includes a data pre-processing process 1001, a model prediction process 1002, and a post processing process 1003. In some embodiments, the method for accelerating an object detection model is described with reference to FIG. 10. In one embodiment, the data pre-processing process 1001 may be accelerated by using a data loading library (DALI). The data pre-processing process may include processing processes such as an image reading process 1004, an image decoding process 1005, and an image scaling process 1006. In this embodiment, the image decoding process 1005 may be accelerated by using a nvjpeg acceleration library in a data loading library (DALI). The image scaling process 1006 that consumes a long time is deployed in a GPU. All data processing links are realized through the data loading library (DALI) based on static images to further improve a data processing speed of the entire preprocessing process.

In one embodiment, the model prediction process 1002 may include a model forward process 1007, a decoding anchor location and a category prediction process, and a non-maximum value suppression process. The model forward process 1007 in the model prediction process 1002 may be accelerated by using a tensorRT optimizer. For example, the tensorRT first may optimize a convolution operation process of each computation layer in the object detection model, and each computation layer is accelerated by using an inter-layer fusion technology. In some embodiments, the convolution layer, a BN layer, and an activation layer may be combined into a network structure to reduce GPU resource occupation. A hardware characteristic may be adapted based on the tensorRT to optimize utilization of a video RAM, thereby supporting in processing high concurrent requests. Based on a characteristic that the tensorRT supports a model quantization operation, float 32-bit operation is quantized to int8 for calculation, thereby further reducing consumption of the video RAM and accelerating convolution operation.

In one embodiment, the data processing speed of the model can be improved by parallelizing the data processing processes. For example, the data pre-processing process 1001 and the model forward process 1007 are deployed as being performed in parallel to accelerate data processing.

By using the foregoing technical solution, the two most time-consuming data processing processes in the object detection process, namely, the data pre-processing process and the model forward process, are accelerated. Then, the two processes are performed in parallel. In this way, the data processing speed of the object detection model can be effectively improved.

Table 1 is a model performance data table provided in this embodiment. Data in Table 1 is model performance data obtained in a process of detecting a 512*512 image by using a dual-stream object detection model and by using the DALI, the tensorRT, or a combination of the DALI and tensorRT, and includes model precision, a data pre-processing time, a model prediction time, a detection frame rate, and video memory consumption.

TABLE 1

| Method | Precision | Batch size | Data pre-processing time | Model prediction time | Detection frame rate | Video memory consumption |
|---|---|---|---|---|---|---|
| Not used | 0.7786 | 1 | 30 ms | 42 ms | 13.9 FPS | 805M |
| DALI | 0.7786 | 1 | 4 ms | 42 ms | 21.7 FPS | 835M |
| tensorRT (float32) | 0.7786 | 1 | 30 ms | 24 ms | 18.5 FPS | 1045M |
| tensorRT (int8) | 0.7733 | 1 | 30 ms | 14 ms | 22.7 FPS | 677M |
| DALI + tensorRT (int8) | 0.7733 | 1 | 4 ms | 13 ms | 58.8 FPS | 719M |
| DALI + tensorRT (int8) | 0.7733 | 16 | 120 ms (in parallel) | | 133.3 FPS | 1605M |

As can be learned based on the data in Table 1, the detection frame rate of the model can be greatly improved by using the DALI and the tensorRT, and may be improved from 13.9 FPS to 133.3 FPS. The detection speed is improved for approximate 10 times. In this embodiment, the object detection model can process high concurrent requests by using the data loading library (DALI) and the tensorRT optimizer.

All the foregoing optional technical solutions may be arbitrarily combined to form an optional embodiment of this application, and details are not described herein again.

Figure 11:
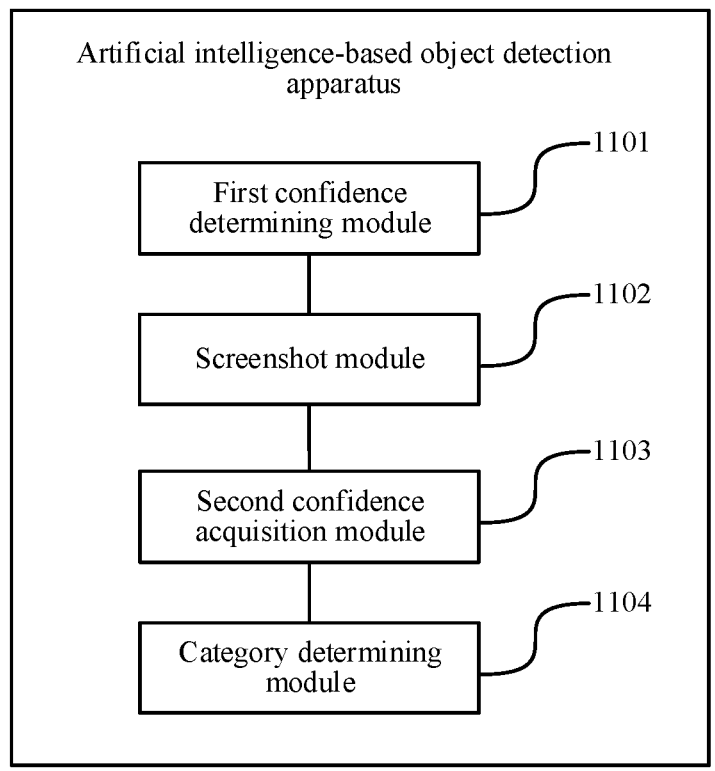
FIG. 11 is a schematic structural diagram of an artificial intelligence-based object detection apparatus according to an embodiment of this application.

FIG. 11 is a schematic structural diagram of an artificial intelligence-based object detection apparatus according to an embodiment of this application. As shown in FIG. 11, the apparatus includes:

a first confidence level determining module 1101, configured to: input a target image including an object to an object detection model, so that the object detection model performs feature extraction on the target image to obtain a plurality of feature images of different scales; and determine, based on the plurality of feature images of different scales, image location information of the object and first confidence level that the object belongs to various categories;

a screenshot module 1102, configured to take a screenshot of the target image based on the image location information of the object to obtain a screenshot image;

the screenshot module 1102 is also referred to as a target region acquisition module, configured to acquire, from the target image based on the image location information of the object, a target region in which the object is located;

a second confidence level acquisition module 1103, configured to input the screenshot image to an object retrieval model, so that the object retrieval model compares the screenshot image with sample images of a plurality of categories to obtain second confidence level that the object belongs to the various categories;

the second confidence level acquisition module 1103 is configured to input the target region to an object retrieval model, so that the object retrieval model compares the target region with sample images of various categories to obtain second confidence level that the object belongs to the various categories; and a category determining module 1104, configured to determine a target category of the object in the various categories based on the first confidence level and the second confidence level that correspond to the various categories, a sum of the first confidence level and the second confidence level that correspond to the target category being the largest.

In one embodiment, the first confidence level determining module 1101 is configured to:

sequentially perform feature extraction on the target image by using a plurality of neural networks of different scales in the object detection model to obtain a plurality of intermediate feature images of different scales; and perform feature fusion on the plurality of intermediate feature images of different scales to obtain the plurality of feature images of different scales.

In one embodiment, the first confidence level determining module 1101 is configured to:

acquire a first intermediate feature image of a first scale outputted by the last computation layer in a previous neural network of any one of the plurality of neural networks of different scales, and perform downsampling and feature extraction on the first intermediate feature image to obtain a second intermediate feature image of a second scale, where the second scale is less than the first scale.

In one embodiment, the first confidence level determining module 1101 is configured to:

acquire, for a second intermediate feature image of the second scale outputted by any neural network, a first intermediate feature image of the first scale outputted by a previous neural network; perform upsampling on the second intermediate feature image based on the first scale to obtain a second intermediate feature image of the first scale; and perform feature fusion on the second intermediate feature image of the first scale and the first intermediate feature image of the first scale to obtain a feature image of the first scale.

In one embodiment, the first confidence level determining module 1101 is configured to:

add elements at the same location in the second intermediate feature image of the first scale and the first intermediate feature image of the first scale to obtain the feature image of the first scale.

In one embodiment, the first confidence level determining module 1101 is configured to:

perform convolution operation on any one of the plurality of feature images of different scales by using a category prediction subnetwork in the object detection model to obtain a category matrix corresponding to the target image, where the category matrix is used for indicating the first confidence level that the object in the target image belongs to the various categories; and perform convolution operation on any one of the plurality of feature images of different scales by using a location prediction subnetwork in the object detection model to obtain a location information matrix corresponding to the target image, where the location information matrix is used for indicating the image location information of the object in the target image.

In one embodiment, the object retrieval model includes a plurality of retrieval sub-models, and one retrieval sub-model is configured to compare the screenshot image corresponding to the object with sample images of one category, that is, one retrieval sub-model is configured to compare the target region corresponding to the object with sample images of one category.

In one embodiment, the second confidence level acquisition module 1103 is configured to:

acquire a plurality of target sample images from sample images of one category by using any retrieval sub-model, where similarities between any screenshot image corresponding to the object and the plurality of target sample images satisfy a target condition; and determine, based on an image feature of the screenshot image and image features of the target sample images of various categories, the second confidence level that the object belongs to the various categories.

In other words, the second confidence level acquisition module 1103 is configured to:

acquire a plurality of target sample images from the sample images of the category by using any one of the retrieval sub-models, where similarities between the plurality of acquired target sample images and the target region corresponding to the object satisfy a target condition; and determine, based on an image feature of the target region and image features of the target sample images of various categories, the second confidence level that the object belongs to the various categories.

In one embodiment, the second confidence level acquisition module 1103 is configured to:

determine distances between the screenshot image and the target sample images of the various categories based on the image feature of the screenshot image and the image features of the target sample images of the various categories; and determine, based on the distances between the screenshot image and the target sample images of the various categories, the second confidence level that the object belongs to the various categories.

In other words, the second confidence level acquisition module 1103 is configured to:

determine distances between the target region and the target sample images of the various categories based on the image feature of the target region and the image features of the target sample images of the various categories; and determine, based on the distances between the target region and the target sample images of the various categories, the second confidence level that the object belongs to the various categories.

In one embodiment, the object detection model includes a first prediction subnetwork and a second prediction subnetwork, the first prediction subnetwork is configured to predict a location and a category of an object belonging to a first category range, the second prediction subnetwork is configured to predict a category of an object belonging to a second category range, and the second category range is greater than the first category range.

In one embodiment, the first prediction subnetwork includes a category prediction subnetwork and a location prediction subnetwork.

In one embodiment, the apparatus further includes:

a pooling module, configured to separately pool the plurality of feature images of different scales by using the second prediction subnetwork to obtain a plurality of global category prediction matrices.

The category determining module 1104 is further configured to determine, based on the plurality of global category prediction matrices, a category of an object, belonging to the second category range, in the target image.

In the apparatus provided in this embodiment, in the technical solution provided in this embodiment, the object detection model performs feature extraction on the to-be-detected target image to obtain the plurality of feature images of different scales, and determines, based on the plurality of feature images of different scales, the image location information of the object in the target image and the first confidence level that the object belongs to the various categories. The object detection model initially predicts the category of the object. Then, a screenshot of the target image is taken based on the image location information of the object to obtain a screenshot image. The object retrieval model compares the screenshot image with sample images of a plurality of categories to further predict the category of the object, and acquires second confidence level that the object included in the screenshot image belongs to various categories. The first confidence level and the second confidence level that correspond to the various categories are added, and a category with a largest confidence sum is determined as a target category, that is, the category of the object. By using the foregoing apparatus, the object detection model and the object retrieval model are combined to perform category prediction twice, and the object retrieval model modifies the output result of the object detection model, thereby effectively improving accuracy of the prediction result.

When the artificial intelligence-based object detection apparatus provided in the foregoing embodiment performs object detection, the division of the foregoing functional modules is merely used as an example for description. In actual application, the foregoing functions may be assigned to different functional modules, that is, an inner structure of the apparatus is divided into different functional modules to complete some or all of the functions described above. In addition, the artificial intelligence-based object detection apparatus provided in the foregoing embodiment and the artificial intelligence-based object detection method embodiment belong to the same concept. For a specific implementation process of the apparatus, refer to the method embodiment. Details are not described herein again.

The computer device provided in the foregoing technical solution may be implemented as a terminal or a server. For example, the computer device includes one or more processors and one or more memories, the one or more memories store at least one program code, and the at least one program code is loaded and executed by the one or more processors to implement the following operations: inputting a target image including an object to an object detection model, so that the object detection model performs feature extraction on the target image to obtain a plurality of feature images of different scales; determining, based on the plurality of feature images of different scales, image location information of the object and first confidence level that the object belongs to various categories; acquiring, from the target image based on the image location information of the object, a target region in which the object is located; inputting the target region to an object retrieval model, so that the object retrieval model compares the target region with sample images of various categories to obtain second confidence level that the object belongs to the various categories; and determining a target category of the object in the various categories based on the first confidence level and the second confidence level that correspond to the various categories, a sum of the first confidence level and the second confidence level that correspond to the target category being the largest.

In some embodiments, the at least one program code is loaded and executed by the one or more processors to implement the following operations: sequentially performing feature extraction on the target image by using a plurality of neural networks of different scales in the object detection model to obtain a plurality of intermediate feature images of different scales; and performing feature fusion on the plurality of intermediate feature images of different scales to obtain the plurality of feature images of different scales.

In some embodiments, the at least one program code is loaded and executed by the one or more processors to implement the following operations: acquiring a first intermediate feature image of a first scale outputted by the last computation layer in a previous neural network of any one of the plurality of neural networks of different scales, and performing downsampling and feature extraction on the first intermediate feature image to obtain a second intermediate feature image of a second scale, where the second scale is less than the first scale.

In some embodiments, the at least one program code is loaded and executed by the one or more processors to implement the following operations: acquiring, for a second intermediate feature image of the second scale outputted by any neural network, a first intermediate feature image of the first scale outputted by a previous neural network; performing upsampling on the second intermediate feature image based on the first scale to obtain a second intermediate feature image of the first scale; and performing feature fusion on the second intermediate feature image of the first scale and the first intermediate feature image of the first scale to obtain a feature image of the first scale.

In some embodiments, the at least one program code is loaded and executed by the one or more processors to implement the following operations: adding elements at the same location in the second intermediate feature image of the first scale and the first intermediate feature image of the first scale to obtain the feature image of the first scale.

In some embodiments, the at least one program code is loaded and executed by the one or more processors to implement the following operations: performing convolution operation on any one of the plurality of feature images of different scales by using a category prediction subnetwork in the object detection model to obtain a category matrix corresponding to the target image, where the category matrix is used for indicating the first confidence level that the object in the target image belongs to the various categories; and performing convolution operation on any one of the plurality of feature images of different scales by using a location prediction subnetwork in the object detection model to obtain a location information matrix corresponding to the target image, where the location information matrix is used for indicating the image location information of the object in the target image.

In some embodiments, the object retrieval model includes a plurality of retrieval sub-models, and one of the retrieval sub-models is configured to compare the target region corresponding to the object with sample images of one category.

In some embodiments, the at least one program code is loaded and executed by the one or more processors to implement the following operations: acquiring a plurality of target sample images from the sample images of the category by using any one of the retrieval sub-models, where similarities between the plurality of acquired target sample images and the target region corresponding to the object satisfy a target condition; and determining, based on an image feature of the target region and image features of the target sample images of various categories, the second confidence level that the object belongs to the various categories.

In some embodiments, the at least one program code is loaded and executed by the one or more processors to implement the following operations: determining distances between the target region and the target sample images of the various categories based on the image feature of the target region and the image features of the target sample images of the various categories; and determining, based on the distances between the target region and the target sample images of the various categories, the second confidence level that the object belongs to the various categories.

In some embodiments, the object detection model includes a first prediction subnetwork and a second prediction subnetwork, the first prediction subnetwork is configured to predict a location and a category of an object belonging to a first category range, the second prediction subnetwork is configured to predict a category of an object belonging to a second category range, and the second category range is greater than the first category range.

In some embodiments, the first prediction subnetwork includes a category prediction subnetwork and a location prediction subnetwork.

In some embodiments, the at least one program code is loaded and executed by the one or more processors to implement the following operations: separately pooling the plurality of feature images of different scales by using the second prediction subnetwork to obtain a plurality of global category prediction matrices; and determining, based on the plurality of global category prediction matrices, a category of an object, belonging to the second category range, in the target image.

Figure 12:
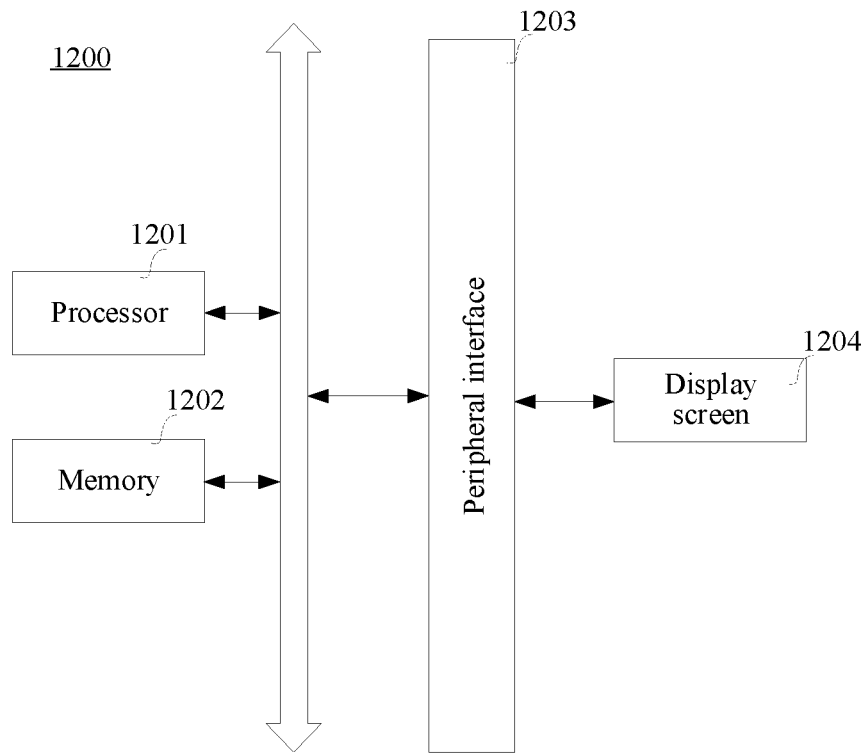
FIG. 12 is a schematic structural diagram of a terminal according to an embodiment of this application.

An example in which the computer device is a terminal is used below for description. FIG. 12 is a schematic structural diagram of a terminal according to an embodiment of this application. The terminal 1200 may be a smartphone, a tablet computer, a notebook computer, or a desktop computer. The terminal 1200 may also be referred to as other names such as user equipment, a portable terminal, a laptop terminal, or a desktop terminal.

Generally, the terminal 1200 includes one or more processors 1201 and one or more memories 1202.

The processor 1201 may include one or more processing cores, for example, a 4-core processor or an 8-core processor. In some embodiments, the processor 1201 may be integrated with a GPU. The GPU is configured to render and draw content that needs to be displayed on a display screen. In some embodiments, the processor 1201 may further include an AI processor. The AI processor is configured to process computing operations related to machine learning.

The memory 1202 may include one or more computer-readable storage media that may be non-transitory. In some embodiments, a non-transitory computer-readable storage medium in the memory 1202 is configured to store at least one program code, and the at least one program code is executed by the processor 1201 to implement the artificial intelligence-based object detection method provided in the method embodiment of this application.

In some embodiments, the terminal 1200 may in some embodiments include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. In some embodiments, the peripheral includes a display screen 1204.

The peripheral interface 1203 may be configured to connect at least one peripheral related to input/output (I/O) to the processor 1201 and the memory 1202.

The display screen 1204 is configured to display a user interface (UI). When the display screen 1204 is a touch display screen, the display screen 1204 is also capable of capturing a touch signal on or above a surface of the display screen 1204. The touch signal may be inputted to the processor 1201 as a control signal for processing. In this case, the display screen 1204 may be further configured to provide a virtual button and/or a virtual keyboard that are/is also referred to as a soft button and/or a soft keyboard.

A person skilled in the art can understand that the structure shown in FIG. 12 does not constitute the limitation to the terminal 1200, more or fewer assemblies may be included as compared with FIG. 12, some assemblies may be combined, or different assemblies may be adopted for arrangement.

Figure 13:
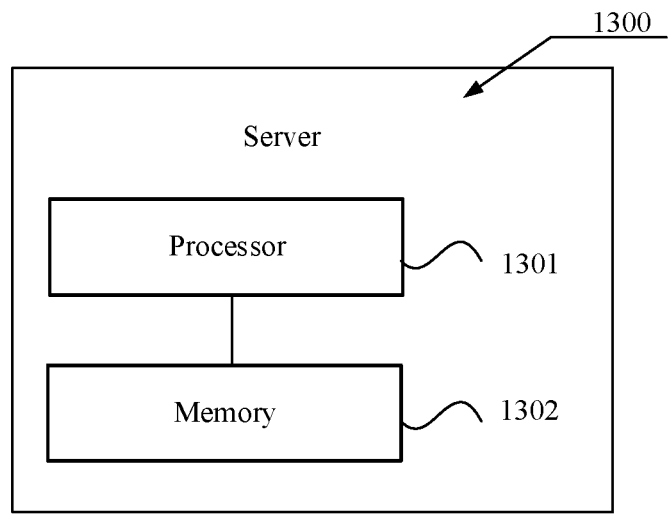
FIG. 13 is a schematic structural diagram of a server according to an embodiment of this application.

An example in which the computer device is a server is used below for description. FIG. 13 is a schematic structural diagram of a server according to an embodiment of this application. The server 1300 may vary greatly due to different configurations or performance, and may include one or more processors (central processing units) 1301 and one or more memories 1302. The one or more memories 1302 store at least one program code, and the at least one program code is loaded and executed by the one or more processors 1301 to implement the method provided in the foregoing method embodiments. Certainly, the server 1300 may also have a wired or wireless network interface, a keyboard, an input/output interface and other components to facilitate input/output. The server 1300 may also include other components for implementing device functions. Details are not described herein.

In exemplary embodiments, a computer-readable storage medium is further provided, for example, a memory including at least one program code. The at least one program code may be executed by a processor to complete the artificial intelligence-based object detection method in the foregoing embodiment. For example, the computer-readable storage medium may be a read-only memory (ROM), a random access memory (RAM), a compact disc ROM (CD-ROM), a magnetic tape, a floppy disk, an optical data storage device, or the like.

In some embodiments, the at least one program code may be loaded and executed by the processor to implement the following operations: inputting a target image including an object to an object detection model, so that the object detection model performs feature extraction on the target image to obtain a plurality of feature images of different scales; determining, based on the plurality of feature images of different scales, image location information of the object and first confidence level that the object belongs to various categories; acquiring, from the target image based on the image location information of the object, a target region in which the object is located; inputting the target region to an object retrieval model, so that the object retrieval model compares the target region with sample images of various categories to obtain second confidence level that the object belongs to the various categories; and determining a target category of the object in the various categories based on the first confidence level and the second confidence level that correspond to the various categories, a sum of the first confidence level and the second confidence level that correspond to the target category being the largest.

In some embodiments, the at least one program code is loaded and executed by the processor to implement the following operations: sequentially performing feature extraction on the target image by using a plurality of neural networks of different scales in the object detection model to obtain a plurality of intermediate feature images of different scales; and performing feature fusion on the plurality of intermediate feature images of different scales to obtain the plurality of feature images of different scales.

In some embodiments, the at least one program code is loaded and executed by the processor to implement the following operations: acquiring a first intermediate feature image of a first scale outputted by the last computation layer in a previous neural network of any one of the plurality of neural networks of different scales, and performing downsampling and feature extraction on the first intermediate feature image to obtain a second intermediate feature image of a second scale, where the second scale is less than the first scale.

In some embodiments, the at least one program code is loaded and executed by the processor to implement the following operations: acquiring, for a second intermediate feature image of the second scale outputted by any neural network, a first intermediate feature image of the first scale outputted by a previous neural network; performing upsampling on the second intermediate feature image based on the first scale to obtain a second intermediate feature image of the first scale; and performing feature fusion on the second intermediate feature image of the first scale and the first intermediate feature image of the first scale to obtain a feature image of the first scale.

In some embodiments, the at least one program code is loaded and executed by the processor to implement the following operations: adding elements at the same location in the second intermediate feature image of the first scale and the first intermediate feature image of the first scale to obtain the feature image of the first scale.

In some embodiments, the at least one program code is loaded and executed by the processor to implement the following operations: performing convolution operation on any one of the plurality of feature images of different scales by using a category prediction subnetwork in the object detection model to obtain a category matrix corresponding to the target image, where the category matrix is used for indicating the first confidence level that the object in the target image belongs to the various categories; and performing convolution operation on any one of the plurality of feature images of different scales by using a location prediction subnetwork in the object detection model to obtain a location information matrix corresponding to the target image, where the location information matrix is used for indicating the image location information of the object in the target image.

In some embodiments, the object retrieval model includes a plurality of retrieval sub-models, and one of the retrieval sub-models is configured to compare the target region corresponding to the object with sample images of one category.

In some embodiments, the at least one program code is loaded and executed by the processor to implement the following operations: acquiring a plurality of target sample images from the sample images of the category by using any one of the retrieval sub-models, where similarities between the plurality of acquired target sample images and the target region corresponding to the object satisfy a target condition; and determining, based on an image feature of the target region and image features of the target sample images of various categories, the second confidence level that the object belongs to the various categories.

In some embodiments, the at least one program code is loaded and executed by the processor to implement the following operations: determining distances between the target region and the target sample images of the various categories based on the image feature of the target region and the image features of the target sample images of the various categories; and determining, based on the distances between the target region and the target sample images of the various categories, the second confidence level that the object belongs to the various categories.

In some embodiments, the object detection model includes a first prediction subnetwork and a second prediction subnetwork, the first prediction subnetwork is configured to predict a location and a category of an object belonging to a first category range, the second prediction subnetwork is configured to predict a category of an object belonging to a second category range, and the second category range is greater than the first category range.

In some embodiments, the first prediction subnetwork includes a category prediction subnetwork and a location prediction subnetwork.

In some embodiments, the at least one program code is loaded and executed by the processor to implement the following operations: separately pooling the plurality of feature images of different scales by using the second prediction subnetwork to obtain a plurality of global category prediction matrices; and determining, based on the plurality of global category prediction matrices, a category of an object, belonging to the second category range, in the target image.

In some embodiments, a computer program or a computer program product including at least one program code is further provided. The computer program or the computer program product, when run on a computer device, causes the computer device to perform any possible implementation of the artificial intelligence-based object detection method provided in the foregoing various embodiments. Details are not described herein again.

A person of ordinary skill in the art may understand that all or some of the steps of the foregoing embodiments may be implemented by hardware, or may be implemented by a program or one piece of program code instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. An artificial intelligence-based object detection method, applied to a computer device, the method comprising:
　　inputting a target image comprising an object to an object detection model;
　　obtaining a plurality of feature images of different scales from the target image using the object detection model;
　　determining, based on the plurality of feature images of different scales, image location information of the object and a first confidence level that the object belongs to each category, wherein the object detection model comprises a first prediction subnetwork and a second prediction subnetwork, the first prediction subnetwork is configured to predict a location and a category of the object belonging to a first category range, the second prediction subnetwork is configured to predict the category of the object belonging to a second category range without utilizing the location of the object, the first category range comprises a first set of classes associated with the first prediction subnetwork, the second category range comprises a second set of classes associated with the second prediction subnetwork, and the second category range is greater than the first category range;
　　wherein after the object detection model obtains the plurality of feature images of different scales, the method further comprises:
　　separately pooling the plurality of feature images of different scales by using the second prediction subnetwork to obtain a plurality of global category prediction matrices; and
　　determining, based on the plurality of global category prediction matrices, a category of an object, belonging to the second category range, in the target image;
　　acquiring, from the target image based on the image location information of the object, a target region in which the object is located;
　　inputting the target region to an object retrieval model, the object retrieval model comparing the target region with sample images of a plurality of categories to obtain a second confidence level that the object belongs to each category; and
　　determining a target category of the object in the plurality of categories based on the first confidence level and the second confidence level of each category, a sum of the first confidence level and the second confidence level that correspond to the target category being the largest of the plurality of categories.

2. The method according to claim 1, wherein obtaining the plurality of feature images of different scales from the target image using the object detection model comprises:

sequentially performing feature extraction on the target image by using a plurality of neural networks of different scales in the object detection model to obtain a plurality of intermediate feature images of different scales; and performing feature fusion on the plurality of intermediate feature images of different scales to obtain the plurality of feature images of different scales.

3. The method according to claim 2, wherein the sequentially performing feature extraction on the target image by using a plurality of neural networks of different scales in the object detection model to obtain a plurality of intermediate feature images of different scales comprises:

acquiring a first intermediate feature image of a first scale outputted by the last computation layer in a previous neural network of any one of the plurality of neural networks of different scales, and performing downsampling and feature extraction on the first intermediate feature image to obtain a second intermediate feature image of a second scale, wherein the second scale is less than the first scale.

4. The method according to claim 3, wherein the performing feature fusion on the plurality of intermediate feature images of different scales to obtain the plurality of feature images of different scales comprises:

acquiring, for the second intermediate feature image of the second scale outputted by any neural network, the first intermediate feature image of the first scale outputted by a previous neural network;

performing upsampling on the second intermediate feature image based on the first scale to obtain a second intermediate feature image of the first scale; and performing feature fusion on the second intermediate feature image of the first scale and the first intermediate feature image of the first scale to obtain a feature image of the first scale.

5. The method according to claim 4, wherein the performing feature fusion on the second intermediate feature image of the first scale and the first intermediate feature image of the first scale to obtain a feature image of the first scale comprises:

adding elements at the same location in the second intermediate feature image of the first scale and the first intermediate feature image of the first scale to obtain the feature image of the first scale.

6. The method according to claim 1, wherein the determining, based on the plurality of feature images of different scales, image location information of the object and the first confidence level that the object belongs to each category comprises:

performing convolution operation on any one of the plurality of feature images of different scales by using a category prediction subnetwork in the object detection model to obtain a category matrix corresponding to the target image, wherein the category matrix is used for indicating the first confidence level that the object in the target image belongs to the plurality of categories; and performing convolution operation on any one of the plurality of feature images of different scales by using a location prediction subnetwork in the object detection model to obtain a location information matrix corresponding to the target image, wherein the location information matrix is used for indicating the image location information of the object in the target image.

7. The method according to claim 1, wherein the object retrieval model comprises a plurality of retrieval sub-models, and one of the retrieval sub-models is configured to compare the target region corresponding to the object with sample images of a corresponding category.

8. The method according to claim 7, wherein that the object retrieval model compares the target region with sample images of the plurality of categories to obtain the second confidence level that the object belongs to the each category comprises:

acquiring a plurality of target sample images from the sample images of the category by using any one of the retrieval sub-models, wherein similarities between the plurality of acquired target sample images and the target region corresponding to the object satisfy a target condition; and determining, based on an image feature of the target region and image features of the target sample images of the plurality of categories, the second confidence level that the object belongs to the corresponding category.

9. The method according to claim 8, wherein the determining, based on an image feature of the target region and image features of the target sample images of the plurality of categories, the second confidence level that the object belongs to each category comprises:

determining distances between the target region and the target sample images of the categories based on the image feature of the target region and the image features of the target sample images of the category; and determining, based on the distances between the target region and the target sample images of the various categories, the second confidence level that the object belongs to the corresponding category.

10. The method according to claim 1, wherein the first prediction subnetwork comprises a category prediction subnetwork and a location prediction subnetwork.

11. An artificial intelligence-based object detection apparatus, comprising a memory and a processor coupled to the memory, the processor being configured to:

input a target image comprising an object to an object detection model, obtain a plurality of feature images of different scales from the target image; and determine, based on the plurality of feature images of different scales, image location information of the object and a first confidence level that the object belongs each category, wherein the object detection model comprises a first prediction subnetwork and a second prediction subnetwork, the first prediction subnetwork is configured to predict a location and a category of the object belonging to a first category range, the second prediction subnetwork is configured to predict the category of the object belonging to a second category range without utilizing the location of the object, the first category range comprises a first set of classes associated with the first prediction subnetwork, the second category range comprises a second set of classes associated with the second prediction subnetwork, and the second category range is greater than the first category range;

wherein after the object detection model obtains the plurality of feature images of different scales, the method further comprises:

separately pooling the plurality of feature images of different scales by using the second prediction subnetwork to obtain a plurality of global category prediction matrices; and determining, based on the plurality of global category prediction matrices, a category of an object, belonging to the second category range, in the target image;

acquire, from the target image based on the image location information of the object, a target region in which the object is located;

input the target region to an object retrieval model, compare the target region with sample images of a plurality of categories to obtain a second confidence level that the object belongs to each category; and determine a target category of the object in the plurality of categories based on the first confidence level and the second confidence level that correspond to each category, a sum of the first confidence level and the second confidence level that correspond to the target category being the largest.

12. A non-transitory computer-readable storage medium, the computer readable storage medium storing at least one program code, and the at least one program code being loaded and executed by a processor to perform:

inputting a target image comprising an object to an object detection model;

obtaining a plurality of feature images of different scales from the target image using the object detection model;

determining, based on the plurality of feature images of different scales, image location information of the object and a first confidence level that the object belongs to each category, wherein the object detection model comprises a first prediction subnetwork and a second prediction subnetwork, the first prediction subnetwork is configured to predict a location and a category of the object belonging to a first category range, the second prediction subnetwork is configured to predict the category of the object belonging to a second category range without utilizing the location of the object, the first category range comprises a first set of classes associated with the first prediction subnetwork, the second category range comprises a second set of classes associated with the second prediction subnetwork, and the second category range is greater than the first category range;

wherein after the object detection model obtains the plurality of feature images of different scales, the method further comprises:

separately pooling the plurality of feature images of different scales by using the second prediction subnetwork to obtain a plurality of global category prediction matrices; and determining, based on the plurality of global category prediction matrices, a category of an object, belonging to the second category range, in the target image;

acquiring, from the target image based on the image location information of the object, a target region in which the object is located;

inputting the target region to an object retrieval model, the object retrieval model comparing the target region with sample images of a plurality of categories to obtain a second confidence level that the object belongs to each category; and determining a target category of the object in the plurality of categories based on the first confidence level and the second confidence level of each category, a sum of the first confidence level and the second confidence level that correspond to the target category being the largest of the plurality of categories.

13. The computer-readable storage medium according to claim 12, wherein obtaining the plurality of feature images of different scales from the target image using the object detection model comprises:

sequentially performing feature extraction on the target image by using a plurality of neural networks of different scales in the object detection model to obtain a plurality of intermediate feature images of different scales; and performing feature fusion on the plurality of intermediate feature images of different scales to obtain the plurality of feature images of different scales.

14. The computer-readable storage medium according to claim 13, wherein the sequentially performing feature extraction on the target image by using a plurality of neural networks of different scales in the object detection model to obtain a plurality of intermediate feature images of different scales comprises:

acquiring a first intermediate feature image of a first scale outputted by the last computation layer in a previous neural network of any one of the plurality of neural networks of different scales, and performing downsampling and feature extraction on the first intermediate feature image to obtain a second intermediate feature image of a second scale, wherein the second scale is less than the first scale.

15. The computer-readable storage medium according to claim 14, wherein the performing feature fusion on the plurality of intermediate feature images of different scales to obtain the plurality of feature images of different scales comprises:

acquiring, for the second intermediate feature image of the second scale outputted by any neural network, the first intermediate feature image of the first scale outputted by a previous neural network;

performing upsampling on the second intermediate feature image based on the first scale to obtain a second intermediate feature image of the first scale; and performing feature fusion on the second intermediate feature image of the first scale and the first intermediate feature image of the first scale to obtain a feature image of the first scale.

16. The computer-readable storage medium according to claim 15, wherein the performing feature fusion on the second intermediate feature image of the first scale and the first intermediate feature image of the first scale to obtain a feature image of the first scale comprises:

adding elements at the same location in the second intermediate feature image of the first scale and the first intermediate feature image of the first scale to obtain the feature image of the first scale.

17. The computer-readable storage medium according to claim 12, wherein the determining, based on the plurality of feature images of different scales, image location information of the object and the first confidence level that the object belongs to each category comprises:

performing convolution operation on any one of the plurality of feature images of different scales by using each category prediction subnetwork in the object detection model to obtain each category matrix corresponding to the target image, wherein the category matrix is used for indicating the first confidence level that the object in the target image belongs to the plurality of categories; and performing convolution operation on any one of the plurality of feature images of different scales by using a location prediction subnetwork in the object detection model to obtain a location information matrix corresponding to the target image, wherein the location information matrix is used for indicating the image location information of the object in the target image.

18. The computer-readable storage medium according to claim 12, wherein the object retrieval model comprises a plurality of retrieval sub-models, and one of the retrieval sub-models is configured to compare the target region corresponding to the object with sample images of a corresponding category.

* * * * *